(12) United States Patent
Wofford et al.

(10) Patent No.: US 12,502,603 B2
(45) Date of Patent: Dec. 23, 2025

(54) SIMULATED LIGHTING SYSTEM AND METHOD FOR COMPOSITED ELEMENTS IN A VIRTUAL ENVIRONMENT

(71) Applicant: NINTENDO CO., LTD., Kyoto (JP)

(72) Inventors: Jon Wofford, Austin, TX (US); Joseph Cherlin, Austin, TX (US)

(73) Assignee: Nintendo Co., Ltd., Kyoto (JP)

( * ) Notice: Subject to any disclaimer, the term of this patent is extended or adjusted under 35 U.S.C. 154(b) by 336 days.

(21) Appl. No.: 18/219,968

(22) Filed: Jul. 10, 2023

(65) Prior Publication Data

US 2025/0018290 A1 Jan. 16, 2025

(51) Int. Cl.
*A63F 13/52* (2014.01)
*G06T 5/70* (2024.01)
*G06T 15/50* (2011.01)

(52) U.S. Cl.
CPC .............. *A63F 13/52* (2014.09); *G06T 5/70* (2024.01); *G06T 15/503* (2013.01); *G06T 15/506* (2013.01); *A63F 2300/6692* (2013.01)

(58) Field of Classification Search
CPC .......... A63F 13/00; A63F 13/25; A63F 13/50; A63F 13/52; A63F 13/53; A63F 13/5378; A63F 13/60

See application file for complete search history.

(56) References Cited

U.S. PATENT DOCUMENTS

| | | | |
|---|---|---|---|
| 6,417,858 B1* | 7/2002 | Bosch ................... | G06T 15/005 345/503 |
| 6,639,595 B1* | 10/2003 | Drebin .................... | G06T 15/02 345/589 |
| 8,674,998 B1* | 3/2014 | Schnitzer ............. | G11B 27/034 345/475 |
| 9,289,691 B2* | 3/2016 | Leyland .................. | A63F 13/23 |
| 10,593,113 B2* | 3/2020 | Lee .......................... | G06T 19/20 |
| 10,964,098 B1* | 3/2021 | Kaplanyan ............ | G06T 15/506 |
| 12,148,085 B2* | 11/2024 | Lee .......................... | G06T 15/80 |
| 2006/0040738 A1* | 2/2006 | Okazaki .................. | A63F 13/45 463/32 |
| 2012/0092367 A1* | 4/2012 | Suzuki .................. | G06T 19/006 345/632 |
| 2015/0109303 A1* | 4/2015 | Boyadzhiev ............ | G06T 11/60 345/426 |
| 2015/0348316 A1* | 12/2015 | Porcino .................. | G06T 15/04 345/426 |

(Continued)

*Primary Examiner* — Chase E Leichliter
(74) *Attorney, Agent, or Firm* — Nixon & Vanderhye PC

(57) ABSTRACT

A virtual environment (e.g., a game environment) is navigable by a user providing user input. The virtual environment is subject to one or more lighting effects from one or more virtual environment light sources therein. A view of the virtual environment is generated in connection with a virtual camera, with that view including at least a portion of a virtual object. The virtual object is defined in connection with an object model. Generation of the view includes: calculating color contributions for sections into which an image obtained from the virtual camera is partitioned; creating a composite image by blending (e.g., additively blending) the calculated color contributions onto the object model using an object mask, the object mask defining different effects to be applied to different parts of the virtual object; and integrating the created composite image in the view of the virtual environment.

31 Claims, 38 Drawing Sheets

(56) References Cited

U.S. PATENT DOCUMENTS

| | | | |
|---|---|---|---|
| 2016/0110903 A1* | 4/2016 | Perrin | G06T 11/60 |
| | | | 345/634 |
| 2017/0354874 A1* | 12/2017 | Bosze | A63F 13/52 |
| 2018/0018812 A1* | 1/2018 | Stall | G06T 15/50 |
| 2018/0207531 A1* | 7/2018 | Kurabayashi | G06F 9/5027 |
| 2018/0240267 A1* | 8/2018 | Smith | G06T 15/04 |
| 2019/0209923 A1* | 7/2019 | Zeng | G06T 15/503 |
| 2021/0086076 A1* | 3/2021 | Zeng | G06T 11/60 |
| 2021/0097734 A1* | 4/2021 | Cockram | G06T 7/70 |
| 2021/0146247 A1* | 5/2021 | Wang | A63F 13/355 |
| 2021/0241676 A1* | 8/2021 | Hazra | G09G 5/10 |
| 2021/0312704 A1* | 10/2021 | Garvey | G06T 15/005 |
| 2022/0028037 A1* | 1/2022 | Skaljak | G06T 5/50 |
| 2022/0032176 A1* | 2/2022 | Liu | A63F 13/52 |
| 2022/0076047 A1* | 3/2022 | Kocdemir | G06V 10/60 |
| 2022/0193540 A1* | 6/2022 | Sun | A63F 13/5258 |
| 2022/0266143 A1* | 8/2022 | Feng | A63F 13/53 |
| 2022/0309741 A1* | 9/2022 | Barreiro | G06T 15/50 |
| 2022/0319104 A1* | 10/2022 | Coffey | G06T 19/00 |
| 2022/0392142 A1* | 12/2022 | Wolfe | G06T 5/70 |
| 2023/0076326 A1* | 3/2023 | Xu | G06T 15/503 |
| 2024/0054721 A1* | 2/2024 | Li | G06T 5/20 |
| 2025/0018290 A1* | 1/2025 | Wofford | A63F 13/52 |
| 2025/0200869 A1* | 6/2025 | Green | G06T 15/40 |
| 2025/0299426 A1* | 9/2025 | Dehkordi | H04N 13/122 |

* cited by examiner

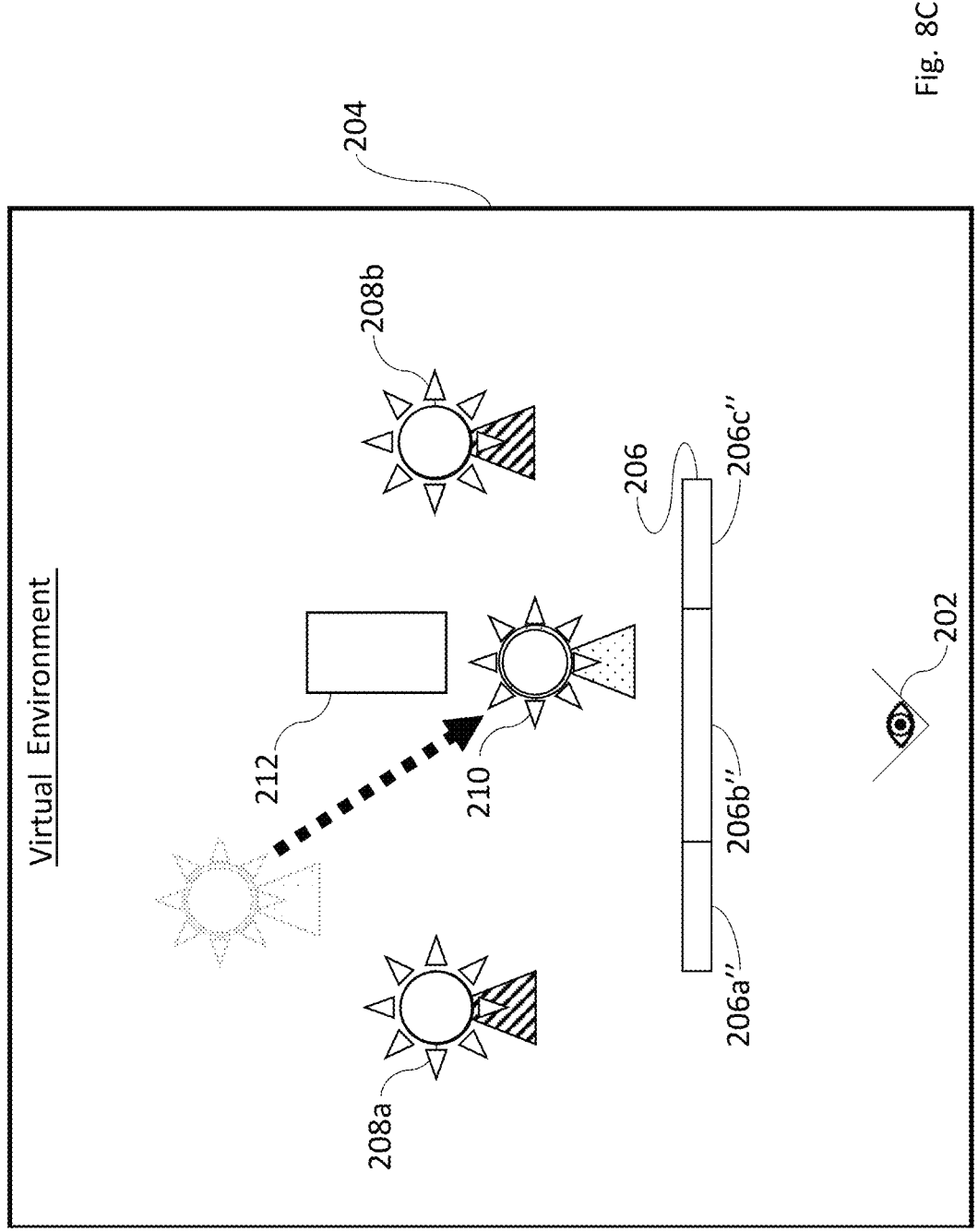

SIMULATED LIGHTING SYSTEM AND METHOD FOR COMPOSITED ELEMENTS IN A VIRTUAL ENVIRONMENT

TECHNICAL FIELD

Certain example embodiments described herein relate to techniques for creating immersive experiences in virtual environments. More particularly, certain example embodiments described herein relate to techniques for displaying objects that appear responsive to lighting elements in a virtual environment such as, for example, a two- or three-dimensional virtual environment that may be used in a video game or the like.

BACKGROUND AND SUMMARY

Virtual environments are used in a host of different applications including, for example, applications that provide gaming experiences, training simulators, virtual art galleries, home and office tours, and/the like. Oftentimes, a user will navigate through the virtual environment and encounter different light sources. These light sources may represent the sun in a flight simulator, wall wash lights in a virtual museum, ceiling lights or wall sconces in a virtual home tour, energy weapons firing in a game, stars when traveling a spaceship, etc.

There are a variety of ways to show lighting effects in virtual environments. For example, many techniques are suitable for displaying static light sources in relatively simple, non-complex virtual environments.

Unfortunately, however, as the environments and/or light sources become more complex, some techniques cannot be used reliably and/or from a practical computing perspective. For example, the problem of creating "realistic" (or at least "expected") lighting effects in virtual environments can become more challenging when there are both static and dynamic lighting effects (with the latter including, for example, dynamic lighting effects that are not "scripted" and/or are otherwise responsive to dynamic user inputs or other triggers).

As another example, in some cases where it is possible to build three-dimensional (3D) models representing the virtual environment and static and/or dynamic light sources, conventional techniques do not always hold up, e.g., when a user is looking at a scene through an object or structure that is subject to lighting effects from at least some of these and/or other light sources. For instance, many techniques will provide unreliable lighting effects if a user is wearing a helmet while travelling through a virtual environment, e.g., in connection with an underwater or space exploration application. Indeed, developers oftentimes will not build a complete 3D model of a helmet because many parts of it will not be perceivable to the user in the virtual environment. For instance, portions of a helmet at the back of and at the crown of the head of a virtual character oftentimes will not be modeled because the virtual character's peripheral vision will not extend to those areas and they thus are in some senses meaningless to a human operator who will never have a need to "see" them.

Although these limited model builds oftentimes are helpful at runtime (e.g., because less computational power is needed to process the effects of a 3D model of a helmet within a 3D model of a broader virtual world), odd effects may result. For example, light sources from behind or directly above a player character may be displayed in the virtual environment, even though they should be "blocked out" by an obstructing structure or object. Other non-lighting related irregularities may occur because of the partial model.

Even in cases where complete 3D models are built, it nonetheless can still be computationally and programmatically challenging to show effects on the inside of a helmet caused by lighting effects external to the helmet. For example, it becomes very challenging to know how to place virtual lights in connection with the object and how to ensure that they properly mix with what is otherwise taking place in a particular scene. Static lights generally will not work in an object like a helmet because lighting effects need to be calculated and implemented in "real time" as the player character with the helmet may be moving around. In contrast, dynamic lights can be very computationally intensive. Moreover, it is difficult to apply tone mapping to lights because careful consideration must be given to determining how bright to make those lights, how to avoid "blowing out" the scene with too much light, how to balance color and intensity with what is going on in the scene (which is an added difficulty with High Dynamic Range (HDR) images), etc.

Some ray tracing techniques may be used to help resolve some issues, but they themselves can require processing resources in excess of what is commonly deployed in a variety of settings (including, for example, with many commercially available mobile devices like smart phones, as well as gaming systems).

Certain example embodiments help address the above-described and/or other technical challenges. For example, certain example embodiments provide techniques that enable complex lighting systems to be used in complex virtual environments, e.g., to create immersive and responsive virtual worlds that match with users' expectations of experiences therein. Such techniques may be particularly useful, for example, when a user explores a virtual world when looking "through" a structure or object (e.g., a helmet, vehicle window, scope, binoculars, an at least partially transparent wall, window, or the like) that includes multiple parts that are differently affected by lighting effects.

In certain example embodiments, there is provided a non-transitory computer readable storage medium comprising instructions that, when executed by at least one processor of an information processing system, are configured to perform operations comprising: providing a virtual environment navigable by a user providing user input, the virtual environment being subject to one or more lighting effects from one or more virtual environment light sources therein; and generating, for the user, a view of the virtual environment in connection with a virtual camera, the view of the virtual environment including at least a portion of a virtual object influenced by the virtual environment, the virtual object being defined in connection with an object model. The generating of the view comprises: calculating color contributions for a plurality of sections into which an image obtained from the virtual camera is partitioned; creating a composite image by blending the calculated color contributions onto the object model in accordance with an object mask, the object mask defining different effects to be applied to different parts of the virtual object; and integrating the created composite image in the view of the virtual environment.

According to certain example embodiments, edges of the calculated color contributions may be blurred (e.g., where there are adjacent sections).

According to certain example embodiments, the created composite image may be a two-dimensional image, and/or the virtual object may be represented as a partial three-dimensional model.

According to certain example embodiments, the object model may include one or more object light sources different from the one or more virtual environment light sources. Lighting effects from the one or more object light sources may or may not be taken into account when calculating the color contributions in different instances.

According to certain example embodiments, the view may include one or more head-up display (HUD) elements that appear to the user as being provided by the virtual object. Lighting effects from the one or more HUD elements may or may not be taken into account when calculating the color contributions in different instances.

According to certain example embodiments, the color contributions may be calculated by downsampling colors in the respective sections, e.g., with the downsampling potentially including calculating average colors for the respective sections.

According to certain example embodiments, a plurality of virtual environment light sources may create a plurality of different lighting effects in the virtual environment, with at least some of the virtual environment light sources being dynamic light sources creating dynamic lighting effects responsive to events transpiring in the virtual environment.

According to certain example embodiments, the view of the virtual environment may be generated at a frame rate, and the image obtained from the virtual camera may correspond to a frame. In certain example embodiments, the calculating, creating, and integrating may be performed on a frame-by-frame basis, e.g., such that different sections are processed with different frames. In some cases, non-adjacent sections may be processed for successive frames.

Regarding the techniques discussed in the preceding paragraphs and in the detailed description, counterpart systems and/or methods also are contemplated herein.

In certain example embodiments, an information processing system is provided, which includes at least one processor and a memory. The at least one processor is configured to perform operations comprising: providing a virtual environment navigable by a user providing user input, the virtual environment being subject to one or more lighting effects from one or more virtual environment light sources therein; and generating, for the user, a view including the virtual environment and at least a portion of a virtual object. The generating of the view comprises: obtaining hotspot data for a capture of the virtual environment; and blending the obtained hotspot data onto the virtual object, in generating the view to incorporate the one or more lighting effects.

According to certain example embodiments, the virtual environment may be a part of a side-scrolling video game.

According to certain example embodiments, the virtual object may be provided in a portion of the view that can overlap with in-environment objects.

According to certain example embodiments, the hotspot data may be obtained by downsampling.

According to certain example embodiments, a plurality of virtual environment light sources may create a plurality of different lighting effects in the virtual environment, with at least some of the virtual environment light sources being dynamic light sources creating dynamic lighting effects responsive to events transpiring in the virtual environment; the view may be generated at a frame rate; and the obtaining and blending may be performed on a frame-by-frame basis, e.g., such that different sections of the capture are processed with different frames.

According to certain example embodiments, hotspot data may be obtained for a plurality of sections into which the capture of the virtual environment is partitioned.

According to certain example embodiments, the blending may be additive and performed, for example, in accordance with an object mask that defines different effects to be applied to different parts of the virtual object.

According to certain example embodiments, the capture may include one or more virtual environment light sources but may lack at least one element that ultimately is displayed to the user via the view including the virtual environment. In certain example embodiments, the capture may lack the virtual object.

Regarding the techniques discussed in the preceding paragraphs and in the detailed description, counterpart non-transitory computer readable storage media and/or methods also are contemplated herein.

In certain example embodiments, an information processing method for use with an information processing system is provided. A virtual environment navigable by a user providing user input is provided, with the virtual environment being subject to one or more lighting effects from one or more virtual environment light sources therein. A view including the virtual environment and at least a portion of a virtual object is generated for the user. The generating of the view comprises: obtaining color hotspot data for a capture of the virtual environment; and blending the obtained color hotspot data onto the virtual object, in generating the view to incorporate the one or more lighting effects.

According to certain example embodiments, the virtual environment may be a three-dimensional virtual environment, the blending may generate a two-dimensional composite image, and the two-dimensional composite image may be integrated in the view including the three-dimensional virtual environment.

According to certain example embodiments, the virtual object may be defined in connection with a three-dimensional model, e.g., that models only a part of the virtual object.

According to certain example embodiments, the virtual object may comprise one or more object light sources different from the one or more virtual environment light sources, and lighting effects from the one or more object light sources may or may not be taken into account when obtaining the color hotspot data.

According to certain example embodiments, the view may include one or more head-up display (HUD) elements that appear to the user being provided by the virtual object, and lighting effects from the one or more HUD elements may or may not be taken into account when obtaining the color hotspot data.

According to certain example embodiments, a plurality of virtual environment light sources may create a plurality of different lighting effects in the virtual environment, with at least some of the virtual environment light sources being dynamic light sources creating dynamic lighting effects responsive to events transpiring in the virtual environment; the view may be generated at a frame rate; and the obtaining and blending may be performed on a frame-by-frame basis, e.g., such that different sections are processed with different frames.

According to certain example embodiments, hotspot data may be obtained for a plurality of sections into which the capture of the virtual environment is partitioned.

According to certain example embodiments, the blending may be additive and may be performed in accordance with an object mask, e.g., that defines different effects to be applied to different parts of the virtual object.

Regarding the techniques discussed in the preceding paragraphs and in the detailed description, counterpart non-transitory computer readable storage media and/or systems also are contemplated herein.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 8A-8C schematically demonstrate how an image changes in accordance with different lighting effects when the compositing techniques of certain example embodiments are applied;

DETAILED DESCRIPTION

Figure 1:
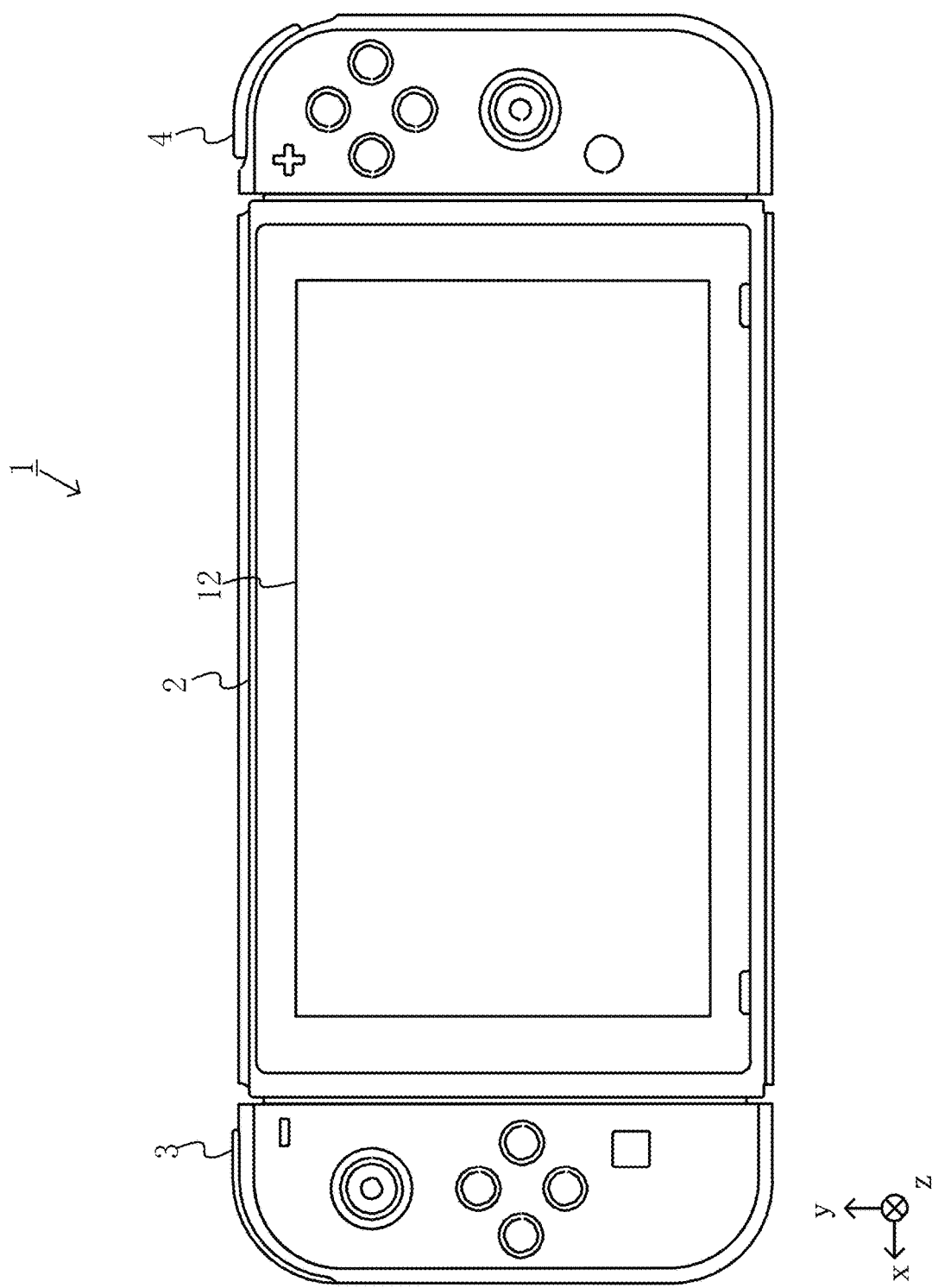
FIG. 1 is a view showing an example where a non-limiting left controller and a non-limiting right controller are attached to a non-limiting main body apparatus.

Certain example embodiments described herein relate to techniques for displaying objects that appear responsive to lighting elements in a virtual environment such as, for example, a two- or three-dimensional virtual environment that may be used in a video game or the like.

A virtual environment (e.g., a game environment) is navigable by a user providing user input. The virtual environment is subject to one or more lighting effects from one or more virtual environment light sources therein. These lighting effects may be static and/or dynamic lighting effects. A view of the virtual environment is generated in connection with a virtual camera in certain example embodiments, with that view including at least a portion of a virtual object (e.g., as a frame around a display screen or the like and through which a user can perceive the virtual environment). The virtual object is defined in connection with an object model. Generation of the view includes: calculating "color contributions (also sometimes called "color hotspots" or simply "hotspots") for sections into which an image obtained from the virtual camera (e.g., a capture similar to a screenshot) is partitioned; creating a composite image by blending (e.g., additively blending) the calculated color contributions onto the object model using an object mask, with the object mask defining different effects to be applied to different parts of the virtual object; and integrating the created composite image in the view of the virtual environment (e.g., as a two- or three-dimensional object in registration with, or otherwise "on," the virtual object). In certain example embodiments, the view of the virtual environment may be generated by in effect superimposing an image over the three-dimensional or other virtual environment, e.g., as seen from the virtual camera or the like. In certain other example embodiment, however, the view of the virtual environment may be generated by in effect rendering the virtual environment in a manner that includes the virtual object and the image (e.g., with the image being superimposed on the virtual object). In such cases, the view of virtual environment will in essence be the virtual environment itself, e.g., as seen through the virtual camera or the like.

It will be appreciated that the techniques disclosed herein may be used in connection with a first-person perspective application, e.g., a video game played from a first-person perspective. Thus, with respect to games in particular, the example techniques disclosed herein may be used in a connection with first-person-perspective shooting or action games, racing games, flight simulators, etc. In these and/or other situations, a person is in essence looking through a frame such as may be provided by a helmet, binoculars, gas mask, sniper scope, space helmet, diving mask, cockpit, exoskeleton or mech suit, etc., and the techniques disclosed herein can be used in such instances. In addition, as discussed below, the techniques disclosed herein may be used in connection with other applications such as, for example, two-dimensional (2D) side scrolling games, games played from a third-person perspective where a virtual camera is located behind a player character, etc. Moreover, the techniques disclosed herein have non-game applications such as, for example, virtual tours of museums, other planets, underwater locations, etc.

Example Information Processing System

The techniques disclosed herein may be used in connection with any suitable information processing system. Suitable information processing systems include at least one processor and a memory connected thereto. The at least one processor may include a CPU, GPU, and/or the like. The memory stores instructions that, when performed by the at least one processor, perform operations. The instructions may be retrieved from a dedicated storage medium local to or remote from the information processing system. In some instances, the instructions may be provided in a cloud computing environment, and the information processing system may provide a cloud gaming or other experience. A display device is connectable to the information processing system. In some instances, the display device may be integral with the housing of the information processing system. A user (e.g., a player playing a game, person navigating through an exhibit as may be found in a virtual museum or the like, etc.) provides input to the information processing system via an input/output (I/O) device such as, for example, a video game controller, keyboard, mouse, joystick, and/or the like.

Additional details regarding an example information processing system that is configured as a game system will now be provided. However, it will be appreciated that the techniques disclosed herein are usable with a variety of different information processing system, and the invention is not be limited to a specific game system or a specific computing configuration unless specifically claimed.

A game system according to an example embodiment is described below. The example game system 1 according includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). An example hardware configuration of the game system 1 is described, and control of the game system 1 according to certain example embodiments is described thereafter.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus configured to perform various processes (e.g., game processing) in the game system 1. The main body apparatus 2 includes a display 12. Each of the left controller 3 and the right controller 4 is an apparatus including operation sections with which a user provides inputs.

Figure 2:
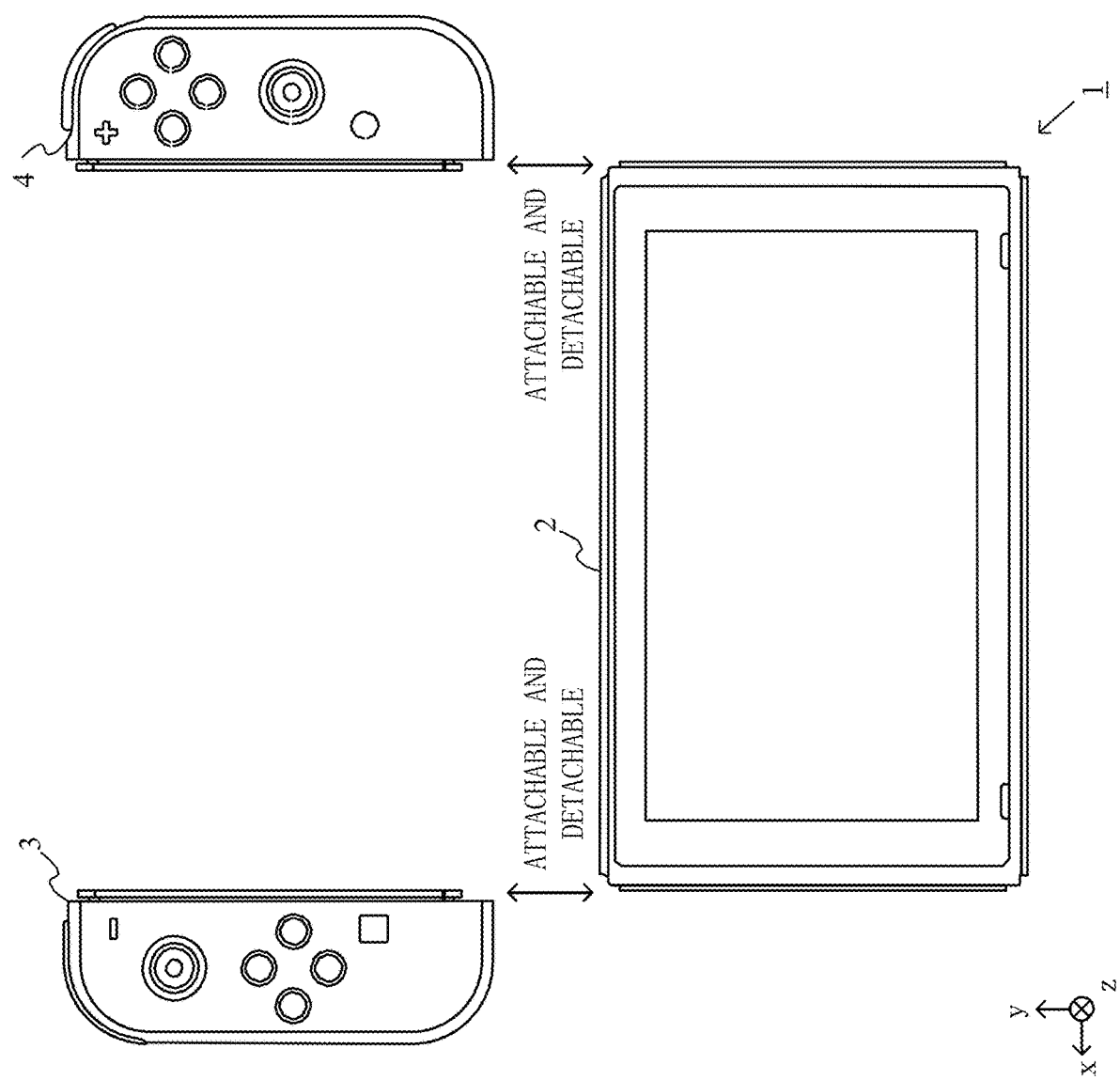
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1-2, the left controller 3 and the right controller 4 are attachable to and detachable from the main body apparatus 2. The left controller 3 and the right controller 4 may be referred to collectively as a controller.

Figure 3:
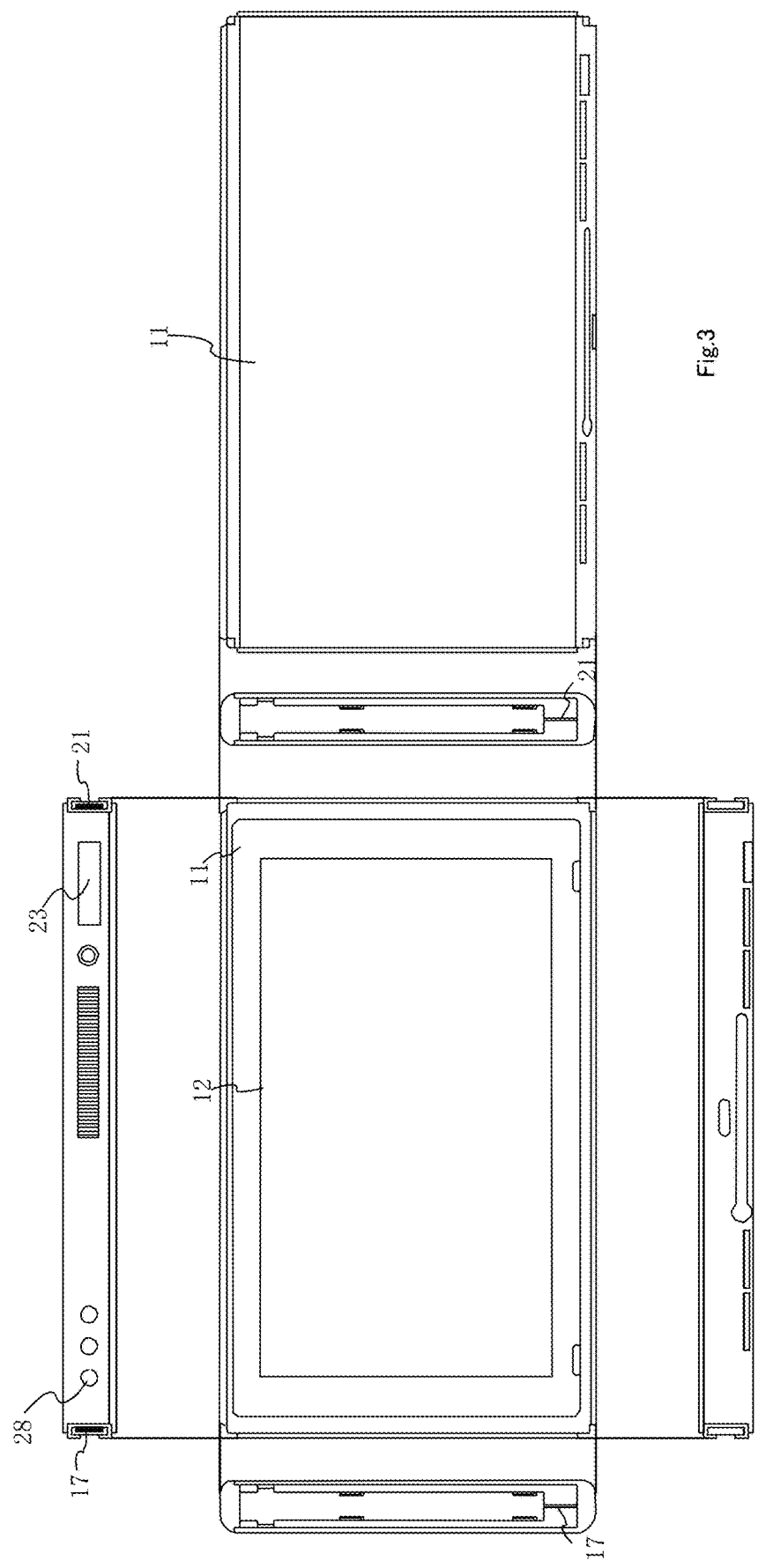
FIG. 3 is a six-sided view showing an example of a non-limiting main body apparatus.

FIG. 3 includes six orthogonal views showing an example of the main body apparatus 2. As shown in FIG. 3, the main body apparatus 2 includes an approximately plate-shaped housing 11. In certain example embodiments embodiment, a main surface (in other words, a surface on a front side, i.e., a surface on which the display 12 is provided) of the housing 11 has a generally rectangular shape.

It should be noted that the shape and the size of the housing 11 are variable. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In certain example embodiments, the display 12 is a liquid crystal display (LCD) device. The display 12, however, may be a display device of any type in different example embodiments.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is shaped to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 4:
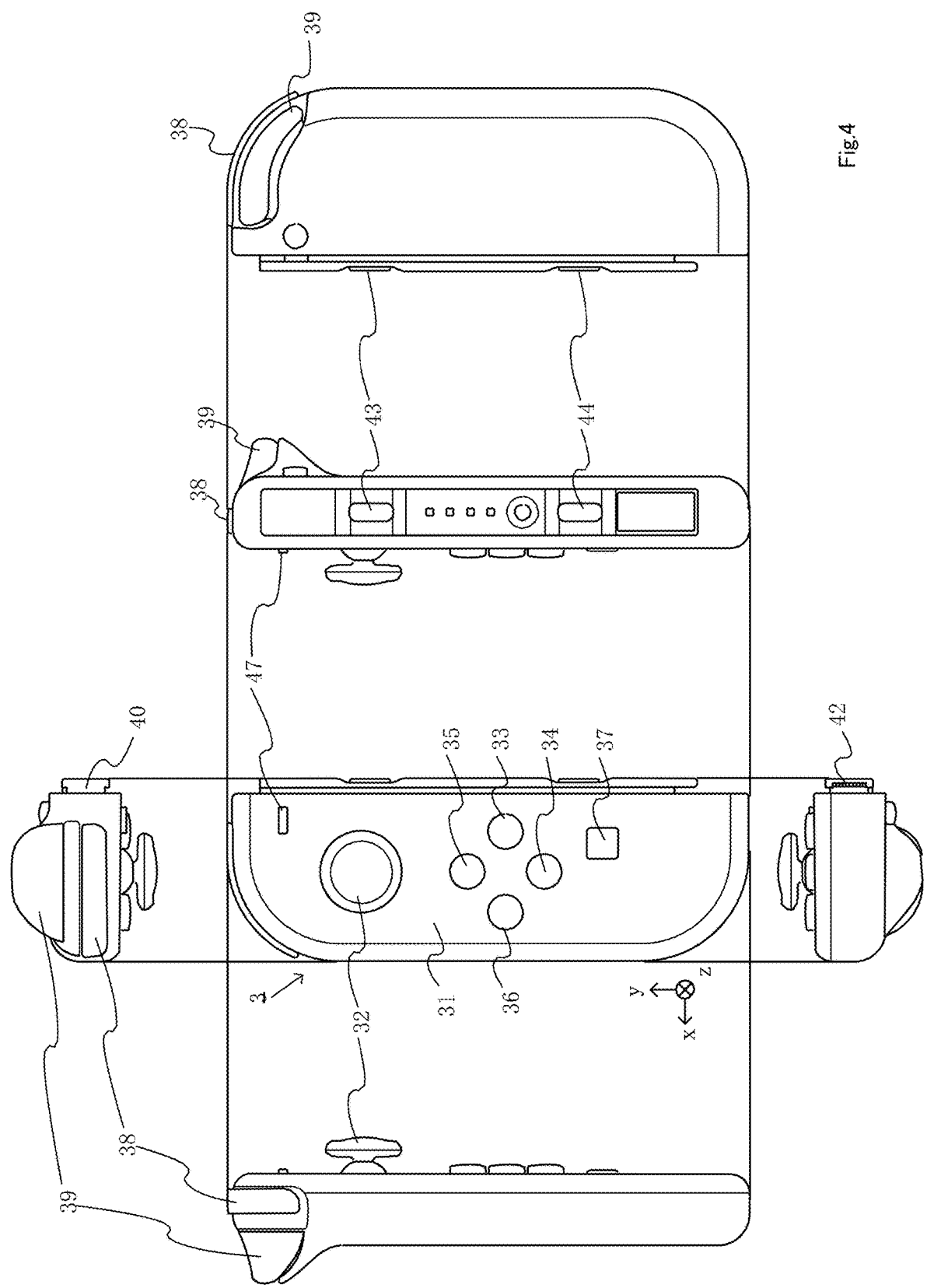
FIG. 4 is a six-sided view showing an example of a non-limiting left controller.

FIG. 4 includes six orthogonal views showing an example of the left controller 3. As shown in FIG. 4, the left controller 3 includes a housing 31. In certain example embodiments, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in certain example embodiments, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
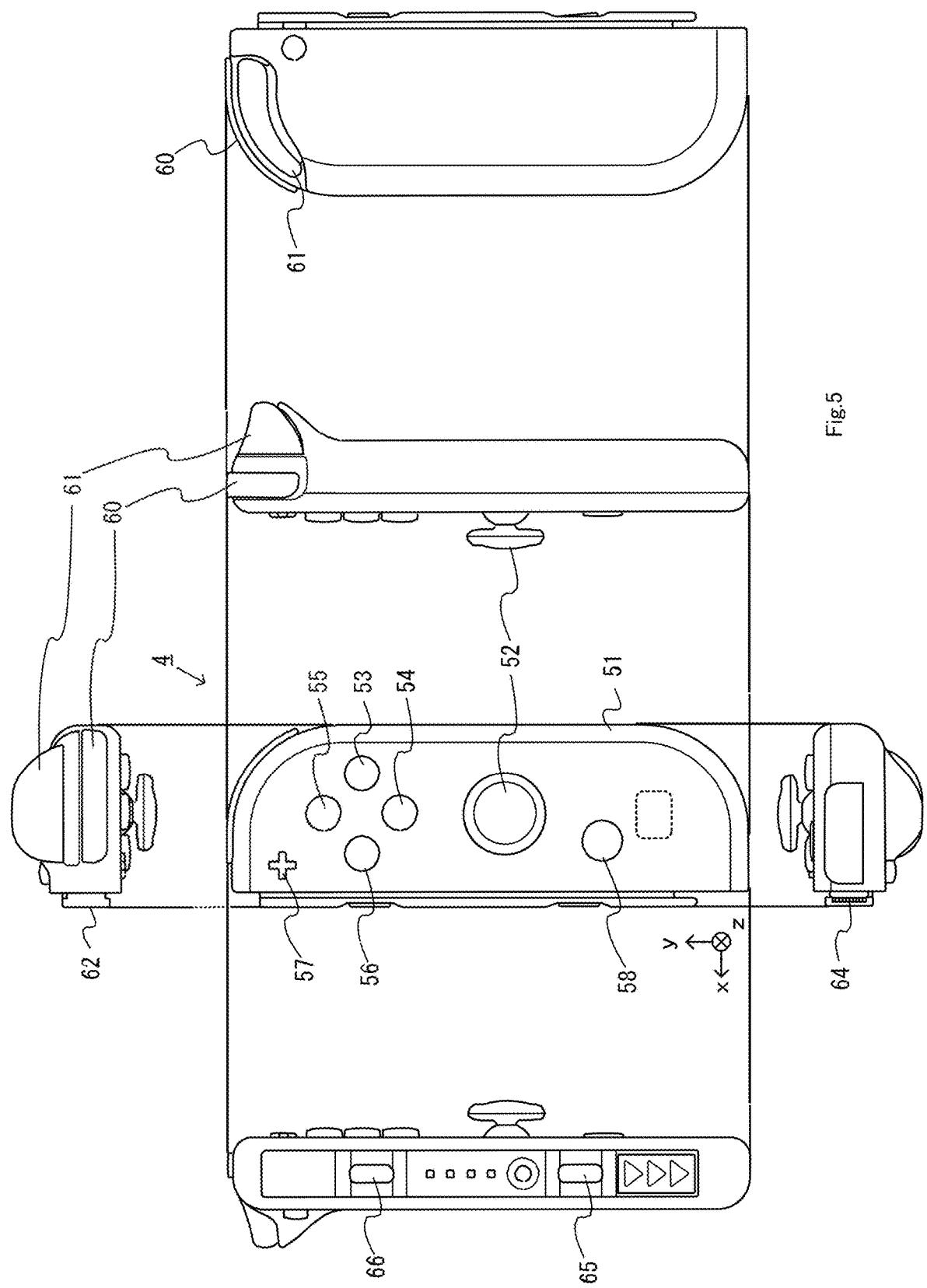
FIG. 5 is a six-sided view showing an example of a non-limiting right controller.

FIG. 5 includes six orthogonal views showing an example of the right controller 4. As shown in FIG. 5, the right controller 4 includes a housing 51. In certain example embodiments, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similar to the left controller 3, the right controller 4 includes an analog stick 52 as a direction input section. In certain example embodiments, the analog stick 52 has the same configuration as that of the analog stick 32 of the left controller 3. Further, the right controller 4 may include a directional pad, a slide stick that allows a slide input, or the like, instead of the analog stick. Further, similar to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
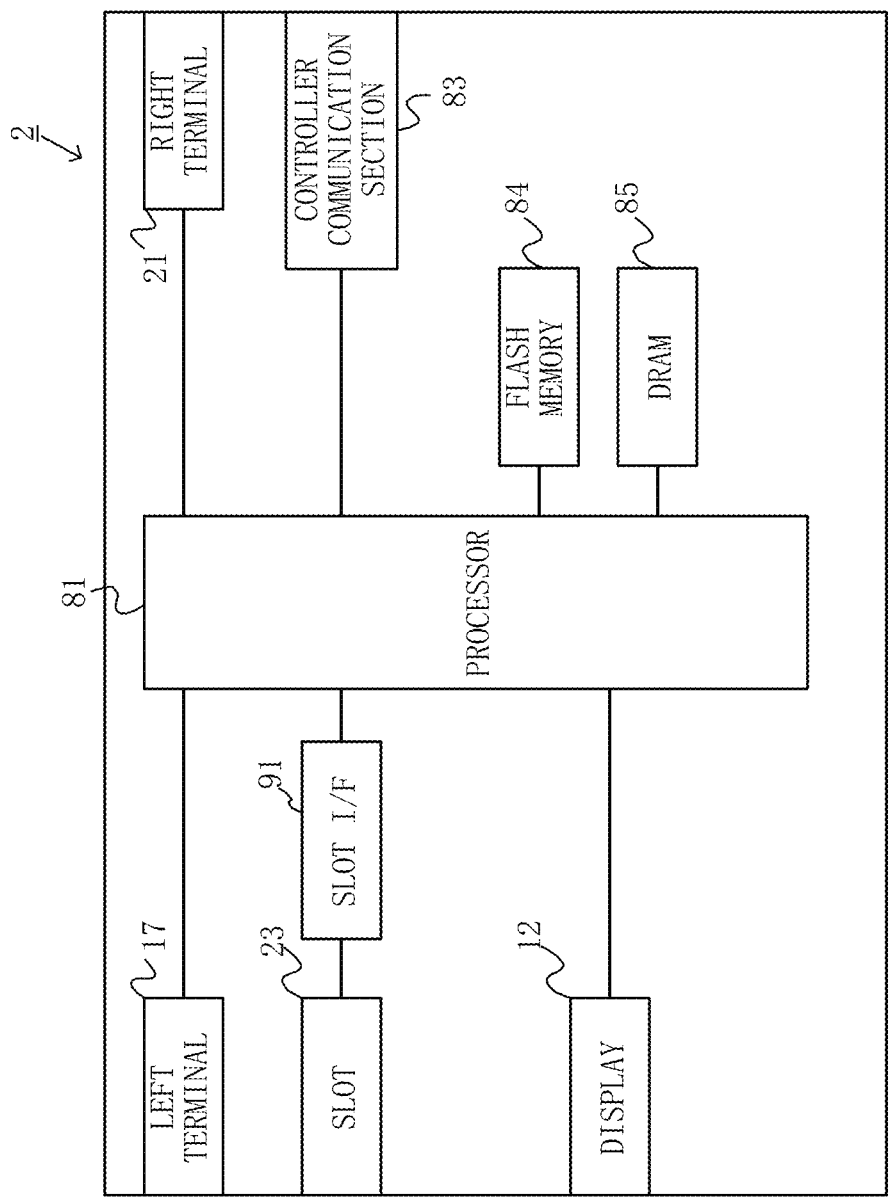
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81, 83 to 85, and 91 shown in FIG. 6 in addition to the components shown in FIG. 3. Some of the components 81, 83 to 85, and 91 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (I/F) 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In certain exemplary embodiments, the controller communication section 83 performs communication compliant with the Bluetooth (registered trademark) standard with the left controller 3 and with the right controller 4.

The processor 81 is connected to the left terminal 17, and the right terminal 21. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. As described above, in the exemplary embodiment, the main body apparatus 2 can perform both wired communication and wireless communication with each of the left controller 3 and the right controller 4.

Further, the display 12 is connected to the processor 81. The processor 81 displays a generated image (e.g., an image generated by executing the above information processing) and/or an externally acquired image on the display 12.

Figure 7:
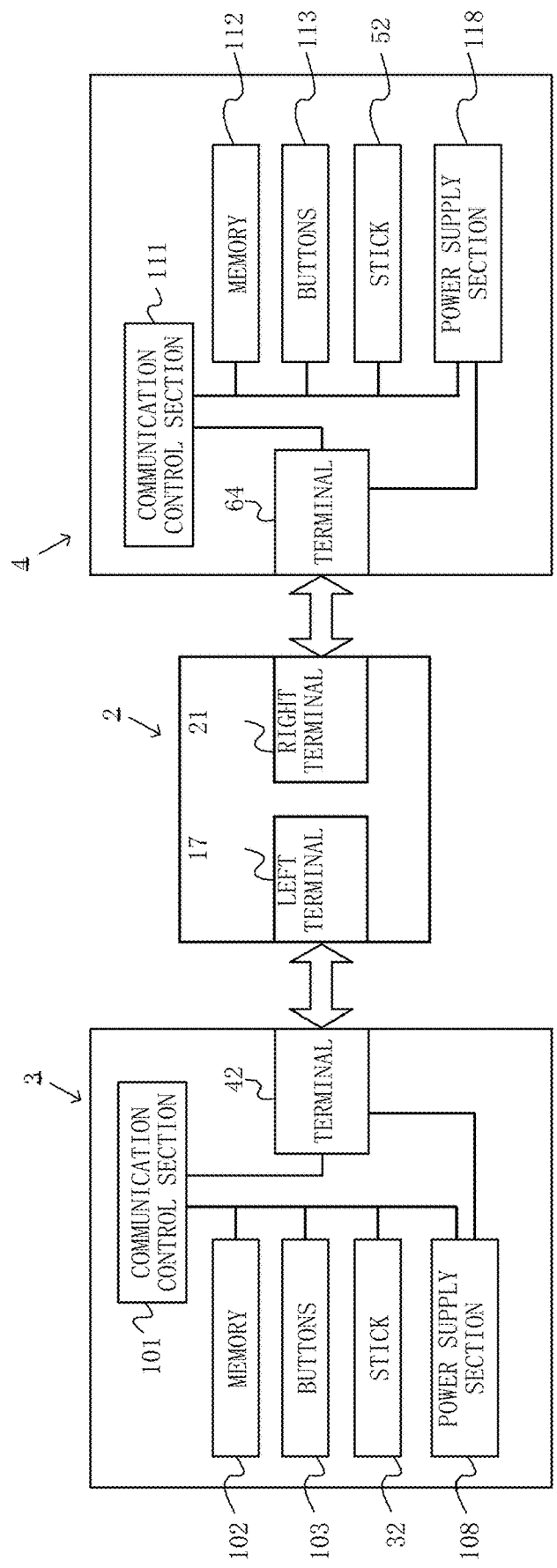
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. Certain details of the internal configuration of the main body apparatus 2 are shown in FIG. 6 and are omitted from FIG. 7.

The left controller 3 includes a communication control section 101, which communicates with the main body apparatus 2. As shown in FIG. 7, the communication control section 101 is connected to components including the terminal 42. In certain example embodiments, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time period. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In certain example embodiments, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Overview of Example Environment and Interactions

Figure 8A:
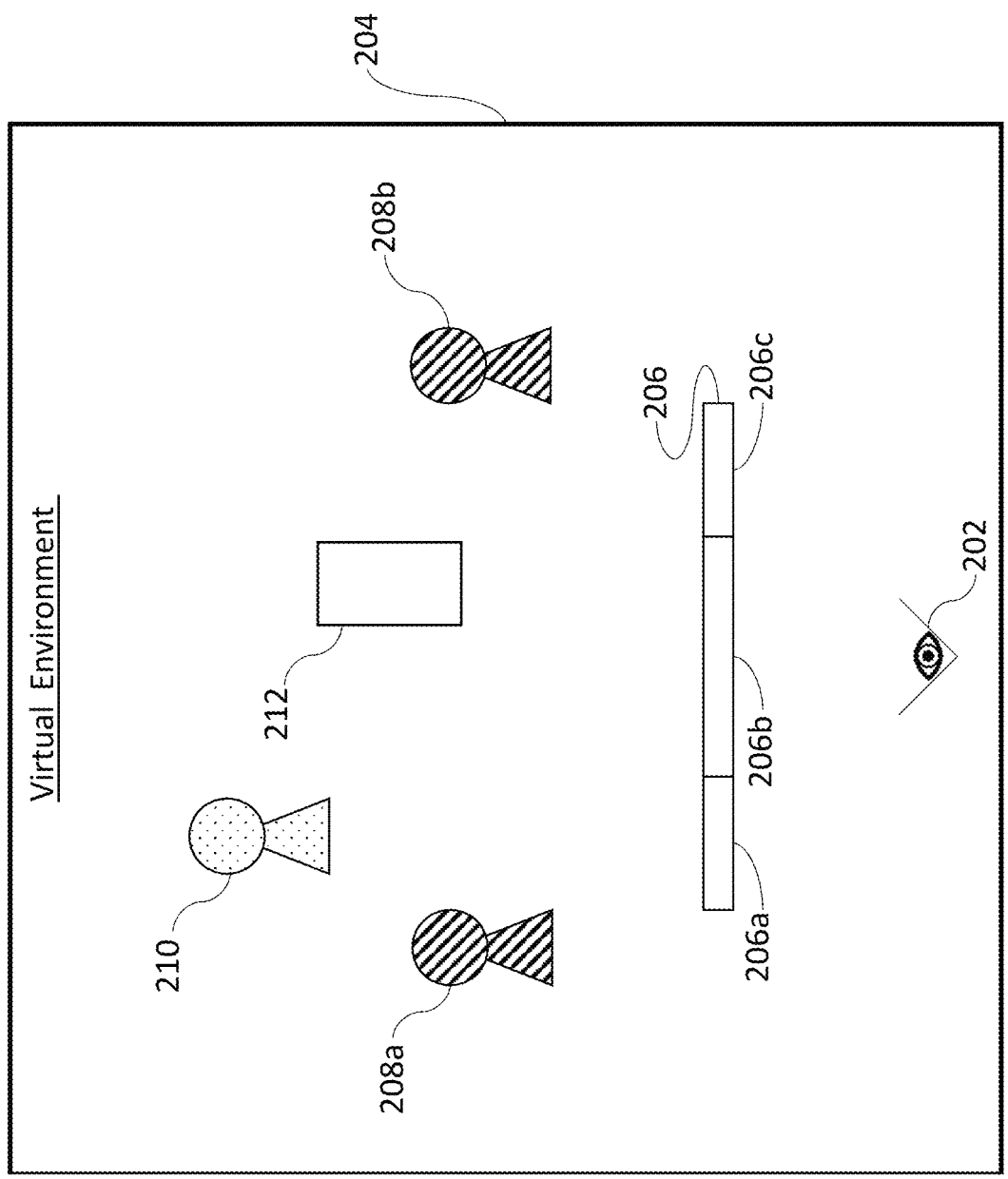
Figure 8B:
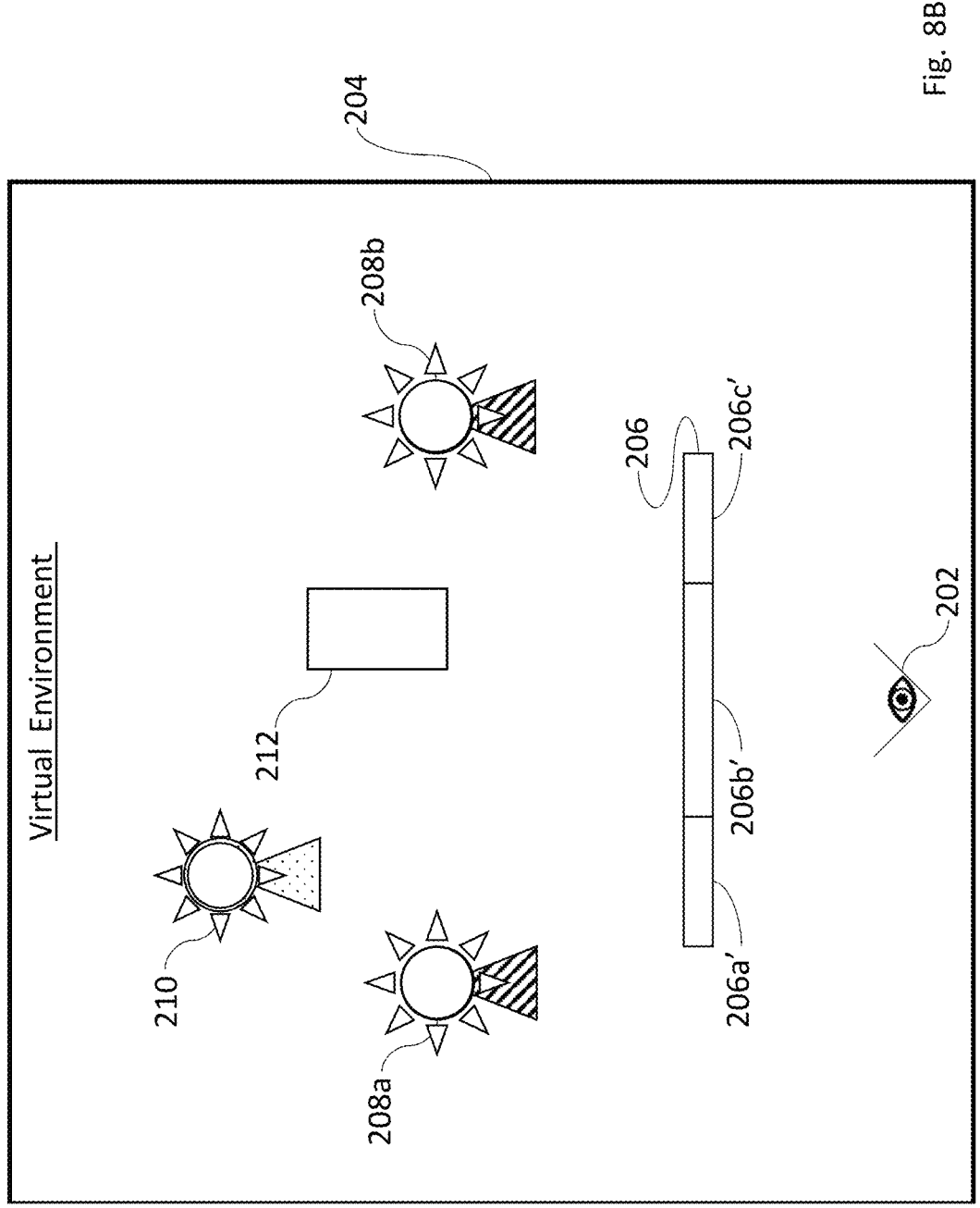

An overview of an example virtual environment and potential interactions therein will now be provided. FIGS. 8A-8C schematically demonstrate how an image changes in accordance with different lighting effects when the compositing techniques of certain example embodiments are applied. In the case of FIGS. 8A-8C, a virtual camera 202 has a view of a virtual environment 204. A structure or object 206 is interposed between elements that create lighting effects. The object 206 may be, for example, a portion of a helmet, vehicle windshield, scope, binoculars, barrier, etc. The object 206 is modeled as a complete or incomplete 3D model in different example embodiments. In some instances, the object 206 may be a 2D object composited into a 3D virtual world. Although the object 206 is shown as being "in" the virtual environment 204, in different example embodiments, the object 206 may or may not be present in the virtual environment 204 itself. That is, in some cases, the object 206 may not be provided "in" the virtual environment 204. For instance, it simply may appear that it is present by virtue of being integrated into a view of the virtual environment 204, e.g., as described in greater detail below. However, in other cases, the object 206 may be represented as an object actually present "in" the virtual environment 204. In such cases, for example, lighting effects that otherwise would be applied to the object 206 in the virtual environment 204 are "turned off" or ignored, and instead the techniques disclosed herein are used to integrate into a view of the virtual environment 204 simulated lighting effects in registration with the object 206 so as to make it is appear that the object 206 is subject to lighting effects in a more responsive manner. In both cases, as the player navigates through the virtual environment, the object 206 appears to be lit in such a way that it appears to convincingly react to lights from the environment 206 and the user's actions, e.g., using the techniques disclosed herein.

The object 206 includes multiple portions 206a-206c, which are differently affected by lighting effects, e.g., because they are formed from different (virtual) materials, different lighting effects are provided in different parts of the virtual environment 204 and thus influence only limited areas of the object 206, etc., For instance, in the case of a helmet, an interior section 206b may represent a transparent see-through area and be positioned between outer sections 206a, 206c, which may form the frame of the helmet. If the interior section 206b is formed of glass, plastic, or the like, and the outer sections 206a, 206c are formed from metal or the like, the lighting effects will influence these portions of the object 206 differently, e.g., in accordance with familiar optical physics principles. As another example, in the case of vehicle, the interior section 206b may be a glass windshield and the outer sections 206a, 206c may be metal or plastic A-pillars. It will be appreciated that these are just examples, and other configurations may be present for these and/or other types of objects. As still another example, a car with its headlights on that is approaching from the left of object 206 likely will cause a greater affect on the outer section 206a compared to the outer section 206c.

In this example, static light sources 208a-208b are shown, along with an example dynamic light source 210. The static light sources 208a-208b may represent ceiling lights, wall sconces, stars, indicator lights, etc. The dynamic light source 210, on the other hand, may represent an object that responds more dynamically to interactions with the virtual environment 204. For example, the dynamic light source 210 may represent a light that is turned on by a user, a proximity alarm that begins flashing, a discharge from an enemy's energy weapon, and/or the like. One or more other objects 212 may be provided in the virtual environment 204. These other objects may be player characters (e.g., in the case of a multiplayer game), non-player characters (NPCs), terrain objects, and/or the like.

FIG. 8B shows that portions of the object 206 react as the static light sources 208a-208b and the dynamic light source 210 are activated. That is, the visual appearance shifts for the exterior portions 206a', 206c', as well as for the central area 206b'. The shifts in appearance may be the same or different, depending (for example) on characteristics of the lighting effects caused by static light sources 208a-208b and the dynamic light source 210 becoming activated, different materials used for the portions of the object 206, preprogrammed rules for how portions of the object 206 should be adjusted, etc. For example, if the lighting effects are so extreme, they may "blow out" the scene regardless of the materials used in the object 206. On the other hand, if the lighting effects caused by the static light sources 208a-208b and the dynamic light source 210 involve different colors and/or intensities, different shifts in the appearances may be caused.

FIG. 8C shows that portions of the object 206 continue to react as the dynamic light source 210 remains activated but moves. That is, the visual appearance again shifts for the exterior portions 206a", 206c", as well as for the central area 206b". As above, the shifts in appearance may be the same or different, depending (for example) on the above-described and/or other characteristics.

A variety of different causes and effects in connection with a variety of different applications are contemplated herein. For example, the object 206 may be a number of different types of objects composed of a number of different types of materials. Similarly, the virtual environment 204 may be a number of different settings such as, for example, a space, underwater, jungle, desert, city street, racetrack, museum, gallery, or other setting. Likewise, more or fewer static and/or dynamic light sources may be provided in connection with the above-described and/or other example lights. It will be appreciated that events occurring in the virtual environment 204 cause changes in the lighting effects, and these events may involve a user navigating a player character through the virtual environment 204 (e.g., by the user providing user input via an input/output device), events with non-player characters and/or other objects occurring in the virtual environment 204, etc.

Several example applications are set forth below to help further explain details concerning how certain example embodiments operate.

Example 1: Helmet in Space Environment

FIGS. 9A-9F provide an example where lighting effects are applied to a first example object in a first three-dimensional scene in accordance with certain example embodiments. The first example object in FIGS. 9A-9F is a helmet, and the first three-dimensional scene is a scene from a three-dimensional virtual environment of space. A user can, for example, navigate through the virtual space environment.

In this example, the helmet object is provided as a three-dimensional object in the three-dimensional virtual environment of space. Thus, the helmet is represented by a three-dimensional model. In certain example embodiments, only a portion of the 3D model for the helmet is generated. This is helpful in certain example embodiments because less space is needed for the model, the helmet can be rendered in the three-dimensional environment more quickly and/or with less processing resources (if at all), etc. Moreover, because the user is unlikely to remove the helmet in space, and because the user cannot see beyond a first maximum angle the left-right direction and a second maximum angle in the up-down direction, for example, there is no loss in detail for the user. In other words, the "missing" model information simply is not relevant to the user experience, at least from the user's visual perspective.

Figure 9A:
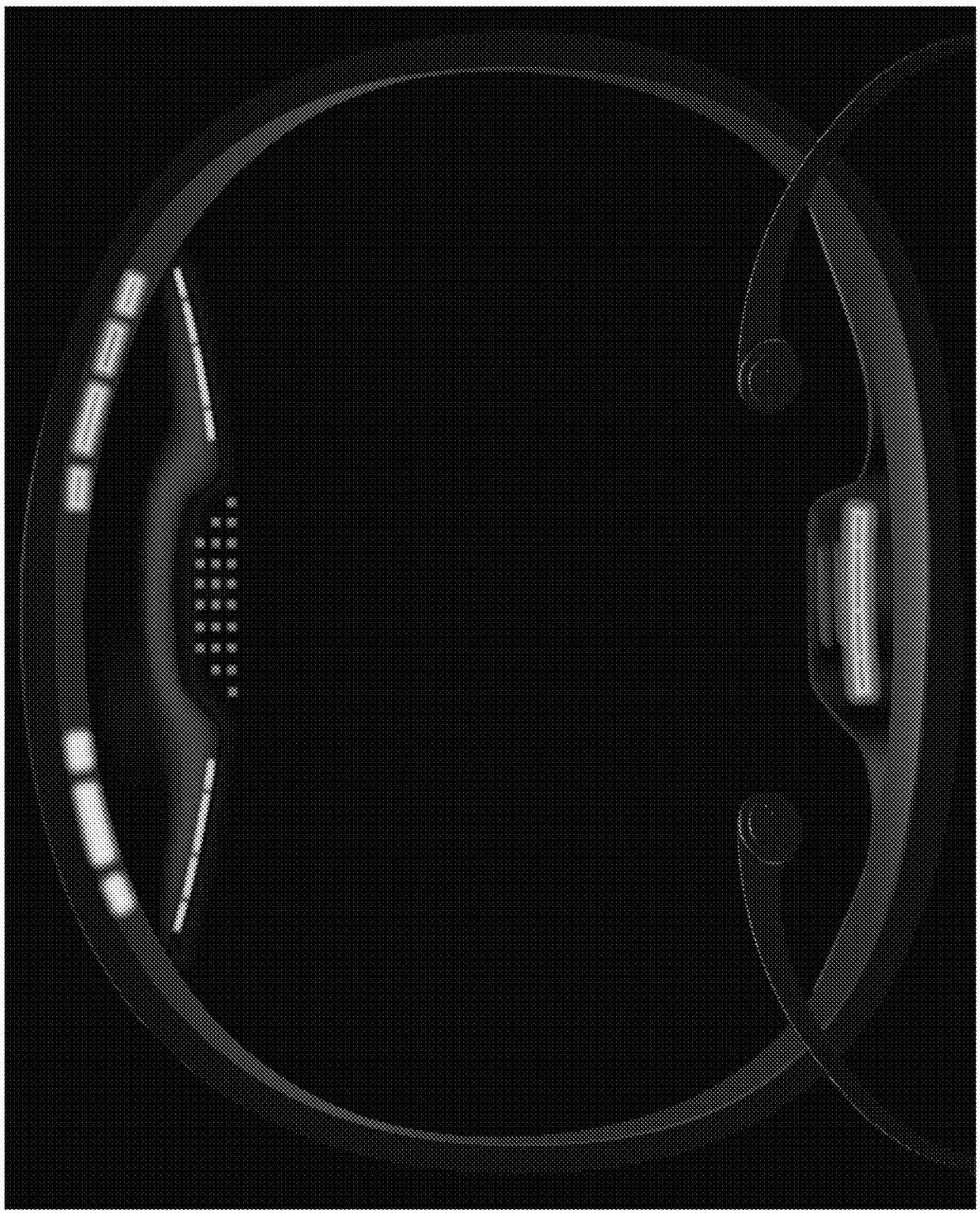
FIGS. 9A-9F provide an example where lighting effects are applied to a first example object in a first three-dimensional scene in accordance with certain example embodiments.

FIG. 9A is a 3D model of the example helmet, which is retrieved from a local or remote data store in certain example embodiments. The 3D model is prepared in advance of the application being executed, e.g., by art department staff in the case of a video game or the like. The model includes texture and other data for the object. The FIG. 9A 3D model is developed as if all external lights were turned off, and as if there were no external lighting effects (e.g., provided from space). Thus, the space interior to the grey exterior frame is shown as being black, even though a glass, plastic, or other transparent material may be provided there. In the FIG. 9A example, the helmet is equipped with several internal lighting elements of its own. In the FIG. 9A model, these elements are turned on. They include, for example, an array of blue lights near the central area of the bottom rim proximate to the vent, yellowish-greenish and reddish lights at the top rim, a top-central LED array, and additional elements flanking the LED array. These light sources, which are different from lighting elements external to the object, create their own lighting effects internal to the helmet being modeled, e.g., as the rim of helmet may be made of an at least partially reflective metal, metallic, or other material. These lighting effects internal to the helmet include reflections on the rim, and they therefore are modeled, as shown in FIG. 9A. Although FIG. 9A is a 3D model, a 2D model may be used for the virtual object in certain example embodiments.

Figure 9B:
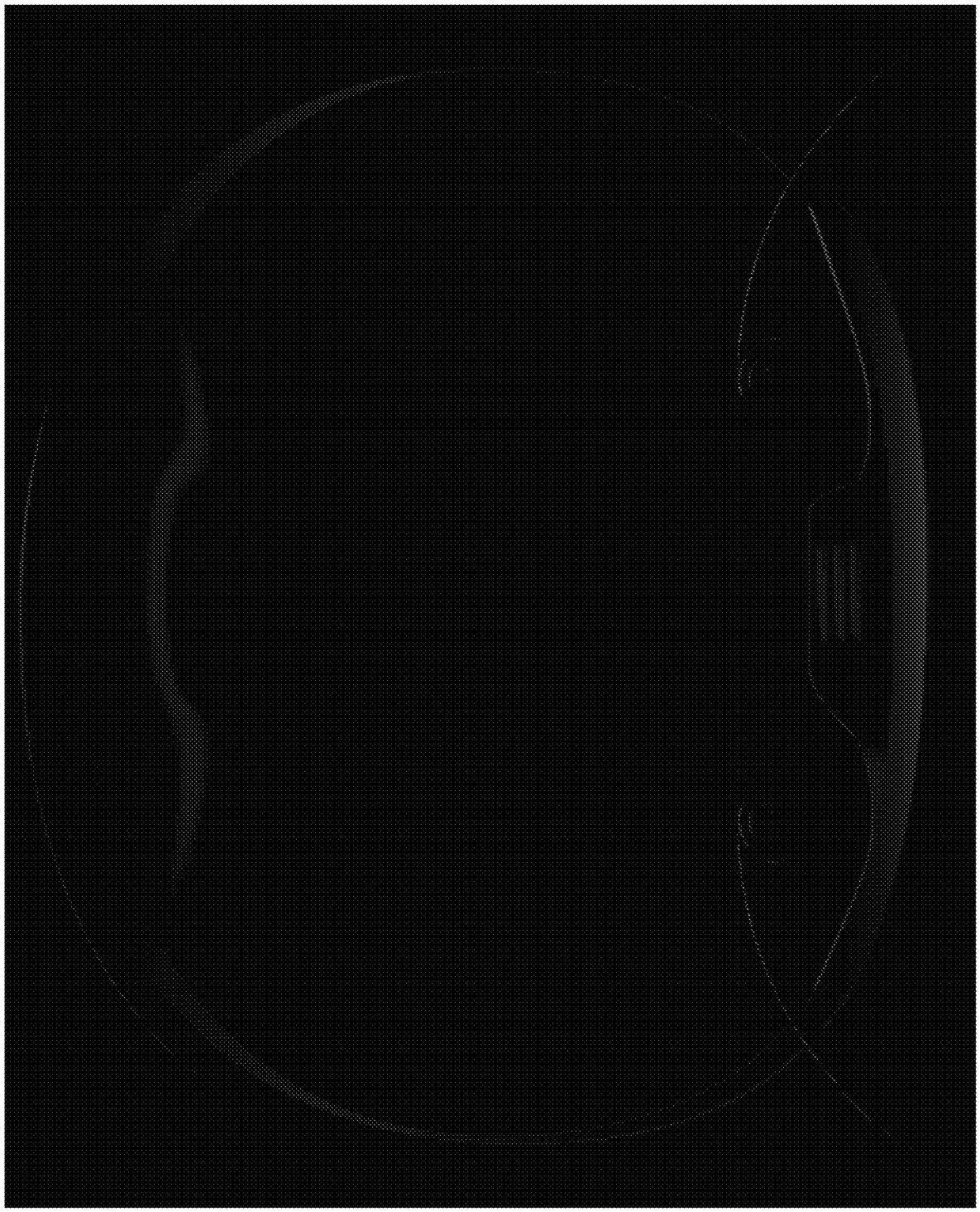

FIG. 9B is a mask showing how different lighting effects affect different portions of the helmet. In brief, this object mask defines different effects to be applied to different parts of the virtual object. Thus, the mask is a light mask map, which is a texture indicating which parts of the mode should receive lighting. Like the FIG. 9A 3D model, the FIG. 9B mask is prepared in advance of the application being executed, e.g., by art department staff in the case of a video game or the like. The FIG. 9B mask, in essence, is built on (or at least in registration with) the FIG. 9A model. However, the lights internal to the helmet from the FIG. 9A model are turned off. The presence of the crimson/red coloration in FIG. 9B shows where external lighting effects (lighting effects caused by light sources external to the helmet) may affect the interior of the helmet. The relative intensity of the crimson/red coloration shows the relative intensity of how external lighting effects may affect the interior of the helmet. For example, the very top central area and the very bottom central area both have red/crimson colorations. The presence of this coloration signifies that external lighting effects may have an impact on these locations. However, the intensity of the coloration at the bottom of the helmet relative to the intensity of the coloration at the top of the helmet signifies that external lighting elements are likely to have a greater impact at the bottom of the helmet relative to the top of the helmet. In general, the lights internal to the helmet likely will wash out any exterior coloration; thus, no or only very faint coloration is provided in these areas.

Figure 9C:
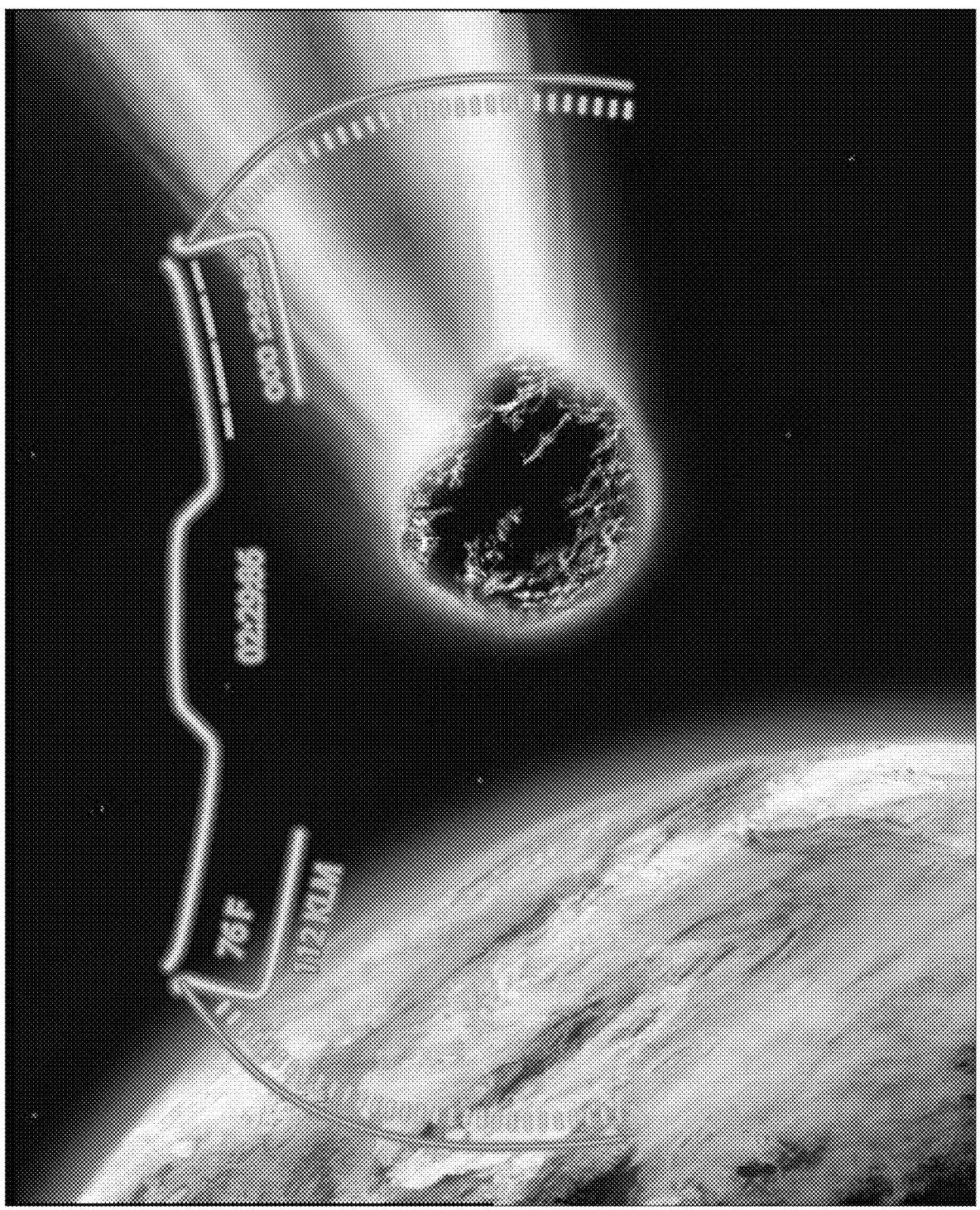

A capture (e.g., similar to a screenshot) of the virtual environment is taken. The capture may be taken in Low Dynamic Range (LDR) mode in certain example embodiments, as that is what would be displayed to players. More particularly, FIG. 9C is a capture of the virtual environment taken without the helmet, where an asteroid is hurtling toward Earth. The asteroid is a light-generating element, insofar as it has a trail of fire (e.g., generated as it enters the Earth's atmosphere). In FIG. 9C, head-up display (HUD) elements are shown. HUD elements are "virtual" images projected onto the interior of the helmet and thus may appear to the user as if they were a part of (or generated/provided by or from) the helmet. In this FIG. 9C example, the HUD elements include time, temperature, distance, and other gauges, along with decorative ornamentation (e.g., areas that match inner contours of the helmet). In certain example embodiments, the capture may or may not include the HUD elements, as these elements may or may not affect the interior lighting of the helmet in different example instances. In other words, in certain example embodiments, the capture may or may not be taken with the HUD elements turned on. Thus, although the term "capture" is used and is similar to a "screenshot," it will be appreciated that the image that is taken is not of an image ultimately displayed to the user. Rather, the capture includes one or more virtual environment light sources/objects that generate lighting effects, but lacks at least one element that ultimately is displayed to the user via the view including the virtual environment. For instance, the capture that is taken may lack the virtual object (in this case, the mask) or a portion thereof, some or all HUD elements (if applicable), etc. In certain example embodiments, the capture includes (or "captures") only the specific data (e.g., from the screen ultimately rendered) that is necessary for the creation of the simulated lighting effect, and may omit or bypass certain objects. The capture of certain example embodiments thus is not displayed in its raw form to the user (and in certain example embodiments is not generated from something that is displayed to the user in its raw form) and instead is used for (and in sometimes based on) internal calculations as discussed in detail herein. The capture thus is similar to what graphics engineers might refer to as "sampling," where certain example embodiments capture only specific graphical data without doing a full screengrab of every rendered pixel.

Although not a HUD element, a reflection of a face sometimes may be visible, and the techniques disclosed herein can be used to simulate that as well.

Figure 9D:
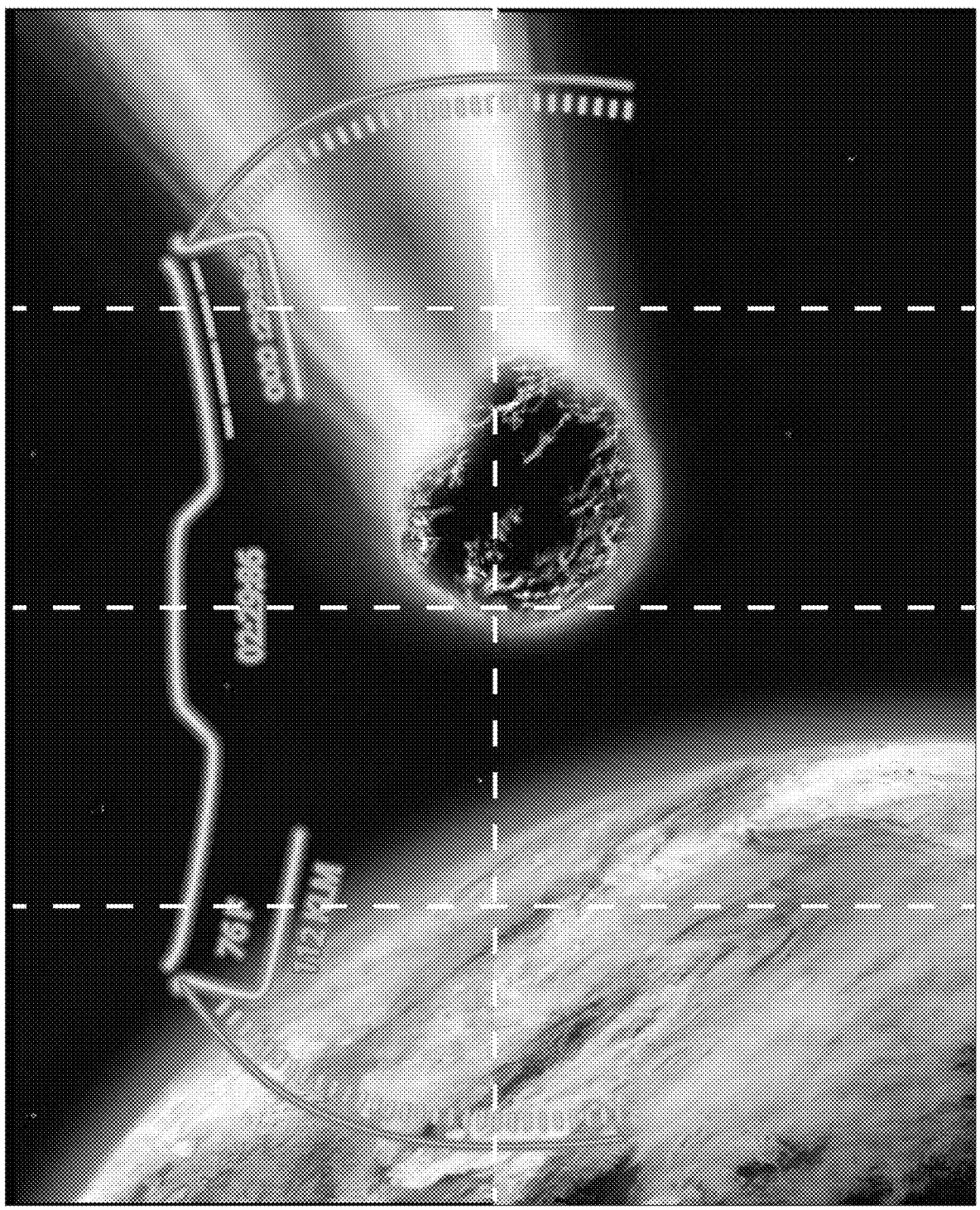

The capture is partitioned (or divided) into a plurality of sections. FIG. 9D shows the capture from FIG. 9C (with the HUD elements and without the helmet) being partitioned (or divided) into two rows and four columns, as an example. However, it will be appreciated that the capture may be partitioned more coarsely or more finely in different example embodiments, provided that at least two sections are generated. Thus, more or fewer rows and/or more or fewer columns may be present in different examples. For instance, a single row may be provided with two, four, eight, or other number of columns in some instances. Similarly, a single column may be provided with two, four, eight, or other number of rows in some other instances. It generally will be advantageous to have more columns when the virtual environment being displayed is oriented in a substantially landscape orientation, and it generally will be advantageous to have more rows when the virtual environment being displayed is oriented in an orientation substantially perpendicular to a landscape orientation.

A color contribution is generated for each of the sections. The color contribution is generated by downsampling the colors in the respective sections in certain example embodiments. For instance, an average color may be calculated or otherwise obtained for each section, and this average color may be used as the color contribution for that section. In other example embodiments, a median color may be used. In still other example embodiments, a most-often repeated color value may be used. In still other example embodiments, interpolation (e.g., bilinear interpolation) may be used to determine a color contribution for each section. As will be appreciated from the above, the HUD elements may or may not be taken into account when generating the color contributions for the sections. Likewise, it will be appreciated that the lighting elements internal to the object may or may not be taken into account when generating the color contributions for the sections. In this example, the HUD elements are taken into account when generating the color contributions for the sections, and the lighting elements internal to the object are not taken into account when generating the color contributions for the sections.

Figure 9E:
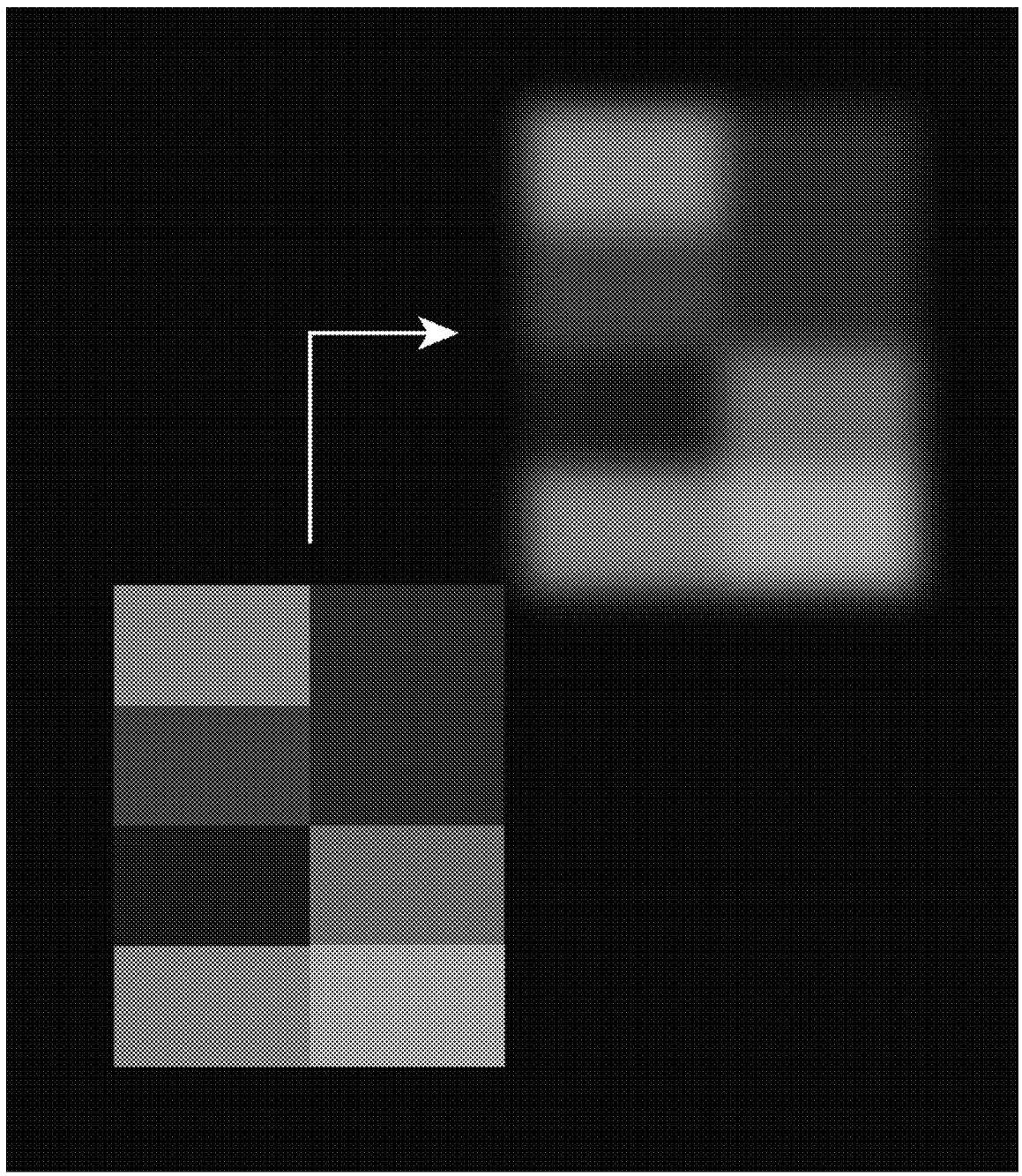

The top left of FIG. 9E shows the average colors for each section. The edges of the colors are blurred so as to make transitions less severe. Doing so also helps to hide hard edges and helps the lighting appear softer. In certain example embodiments, all edges of all sections may be blurred. This is shown in the bottom right of FIG. 9E, which is generated from the top left of FIG. 9E. In certain example embodiments, the edges around the far exterior of the capture will not be blurred; in other words, in certain example embodiments, only those edges adjacent to other sections will be blurred. In certain example embodiments, texture sampling hardware will automatically provide the blur, e.g., when provided with the color contribution or color hotspot data; thus, a separate blurring operation need not be performed in some instances.

In certain example embodiments, a mosaic filter may be applied to arrive at a grid with color values, and color values may be shrunk to a number of pixels equal to the number of cells in the grid. For example, good results have been achieved by obtaining a 1×4 grid of bilinear interpolated pixels, as this was found to increase fidelity and generate results extremely quickly. Making use of a small texture cache was found to provide more aesthetically pleasing results compared to providing more cells.

Figure 9F:
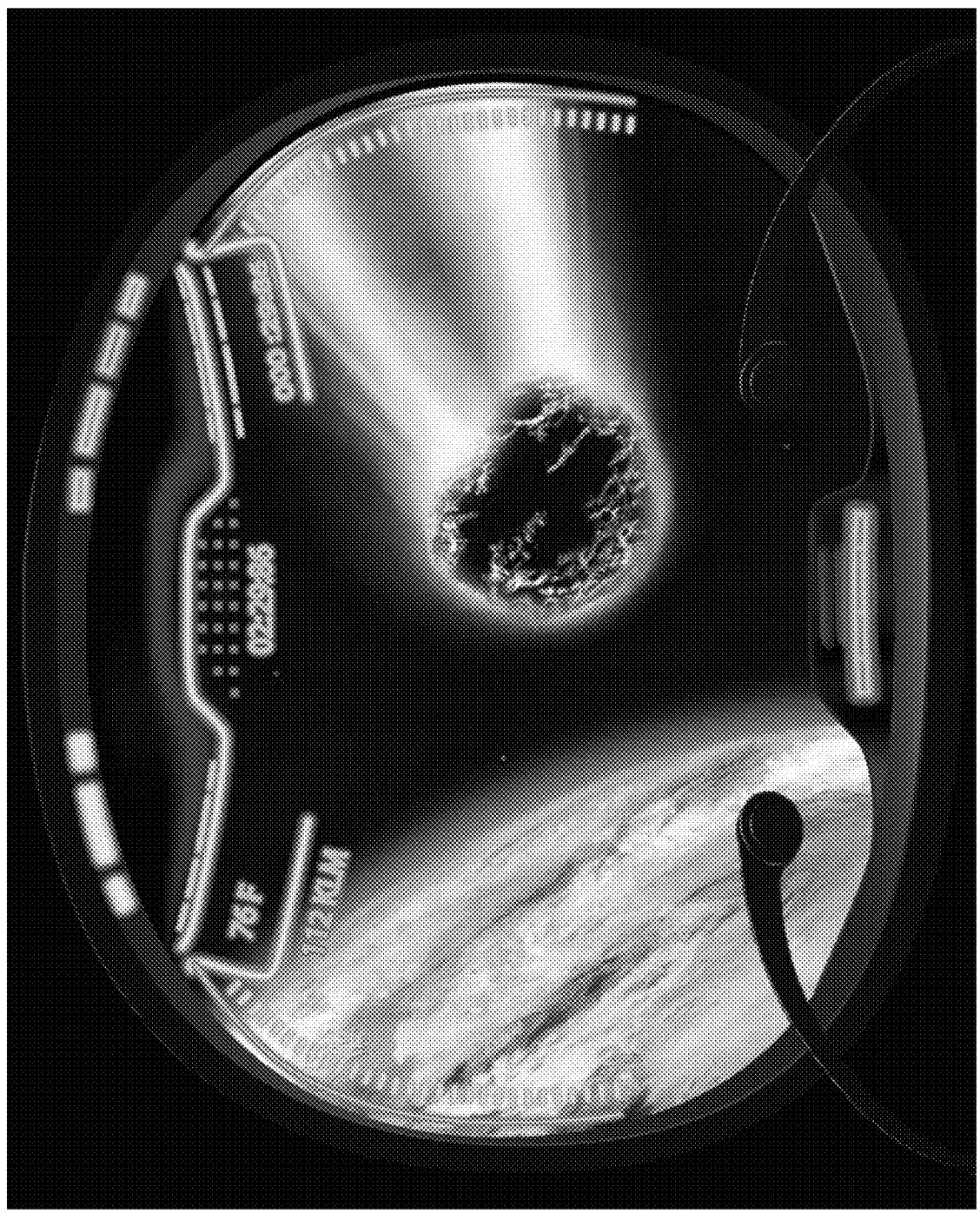

A composite image is created by additively blending the color contributions onto the helmet model in accordance with the helmet mask. In other words, the mask defines the location and intensity of the color contribution or color hotspot to be applied onto the mask model. Additive blending is not performed outside of areas indicated by the mask. A 2D or other composited image thus is generated, and it is layered onto or otherwise integrated into (disposed in) a view of the virtual environment. This is shown in FIG. 9F. That is, the trail of fire and the bluish glow of Earth are shown to have an effect on some portions of the helmet. In other words, the virtual environment is subject to lighting effects from one or more virtual environment light sources therein, and the virtual helmet object is affected by these lighting effects. Because of the right to left and top to bottom movement, the lower right portion of the helmet is shown to have a slight pinkish-reddish reflection. The effect is stronger towards the bottom right compared to the bottom center because of the mask and the color contributions. Thus, the overall view shows, among other things, a helmet that appears to be lit in a manner consistent with both the user's "internal environment" and the on-screen "action." As a result, a view of the virtual environment is generated for user, in connection with a virtual camera, with the view of the virtual environment including at least a portion of the virtual helmet object, except that rather than a 3D object being provided, a created composite image instead is integrated into the virtual environment as a 2D or other layer in certain example embodiments. In certain other example embodiments, a 3D object may be composited in the virtual environment. The composited image or object is provided over (in registration with) the object model in some cases, or it may be placed in the virtual environment without the object model in other cases. The lighted object may be moved around in the virtual environment (on a display screen provided for the user) in response to the character's moves and/or other events in the virtual environment. The moves may be positional moves, rotational moves, etc. Animations and the like also may be applied to the object.

Although this example is shown with a helmet in space, the same approach may be used (for example) for a helmet in an underwater setting. Similarly, more or fewer external light sources (e.g., from stars, the sun, ships battling, etc.) may be incorporated into the scene.

In certain example embodiments, HUD elements and/or a face or other internal object reflection may be affected by the (simulated) lighting. In such cases, the capture is taken without these elements, hotspot data is calculated for that capture, and the hotspot data may be additively blended with both the object model and the HUD elements. For this purpose, a model of the HUD elements may be provided together with or separate from the virtual object (which in this case is the mask).

Example 2: Vehicle in City Environment

FIGS. 10A-10F provide an example where lighting effects are applied to a second example object in a second three-dimensional scene in accordance with certain example embodiments. In this example, the second object is a vehicle interior and the second three-dimensional scene includes a city.

Figure 10A:
FIGS. 10A-10F provide an example where lighting effects are applied to a second example object in a second three-dimensional scene in accordance with certain example embodiments.

FIG. 10A is a 3D model of the vehicle interior. The vehicle interior is modeled to include A-pillars, a dashboard, a windshield, a rearview mirror, a steering wheel, red and yellow lighted elements, a display area adjacent to the steering wheel, etc. As above, the lighted elements and display are shown as being turned on.

Figure 10B:
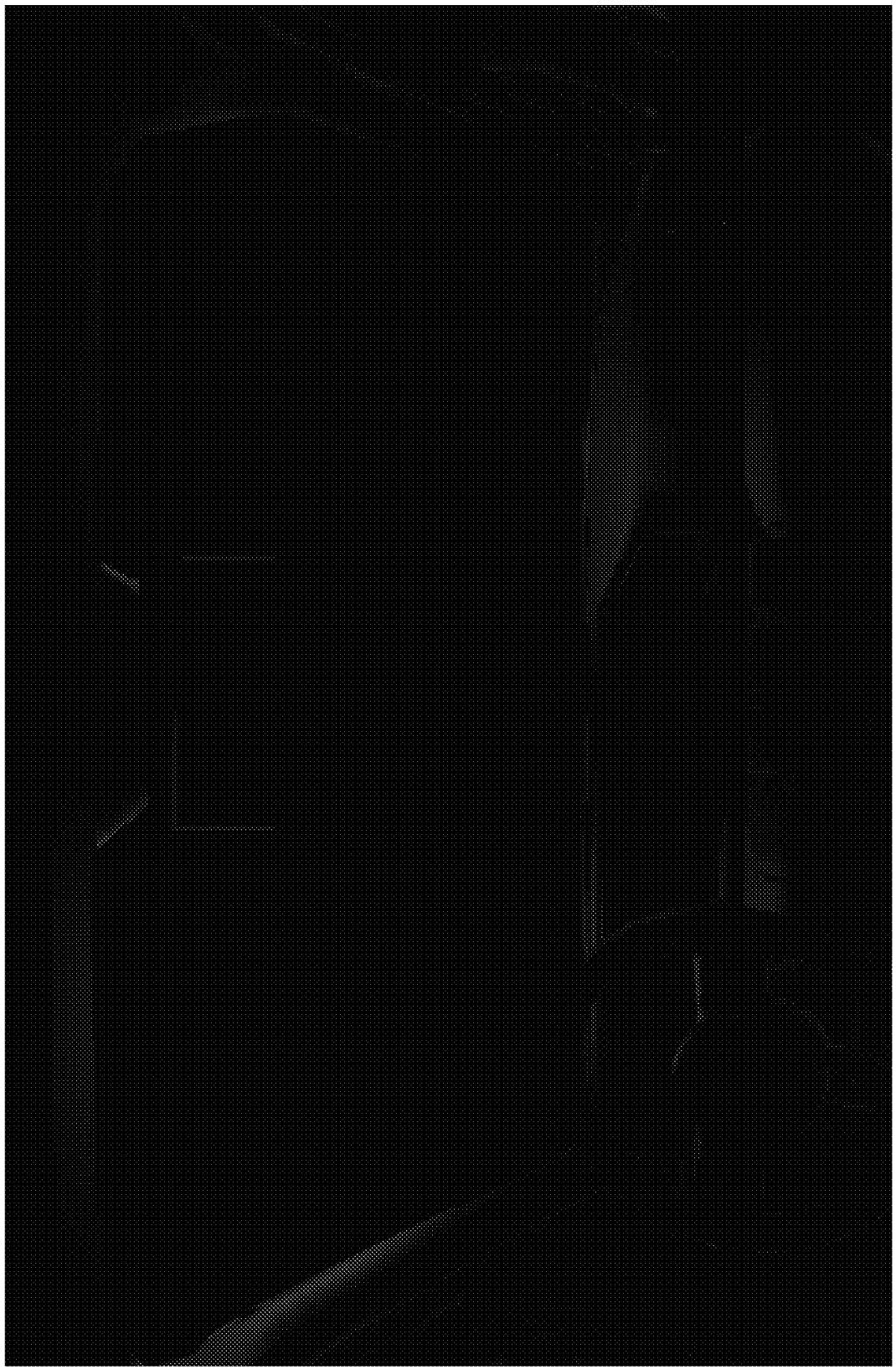

FIG. 10B is a mask applicable to the FIG. 10A model. Again, the crimson-reddish color shows reflective areas, with the relative reflective intensities being demonstrated by differences in the coloration.

Figure 10C:

FIG. 10C is a capture of the city, without the vehicle object being present. There are a number of dynamic and fixed light sources. Fixed light sources include the various groups of streetlights. Dynamic light sources include flashing lights from the police car and the traffic light to the right of the capture. In the FIG. 10C example, HUD elements are shown and include a score area, speedometer, and various indicators.

Figure 10D:
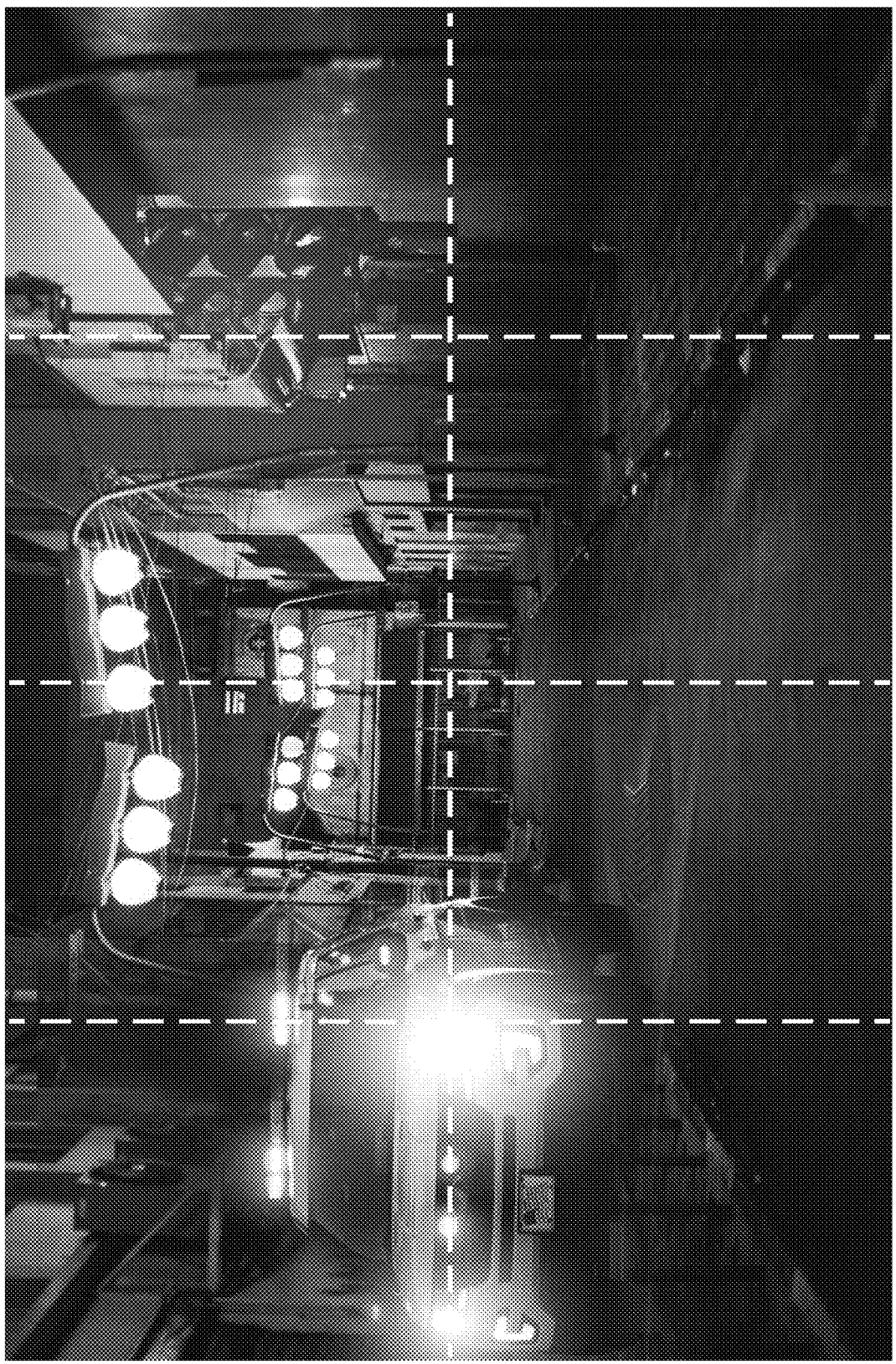
Figure 10E:
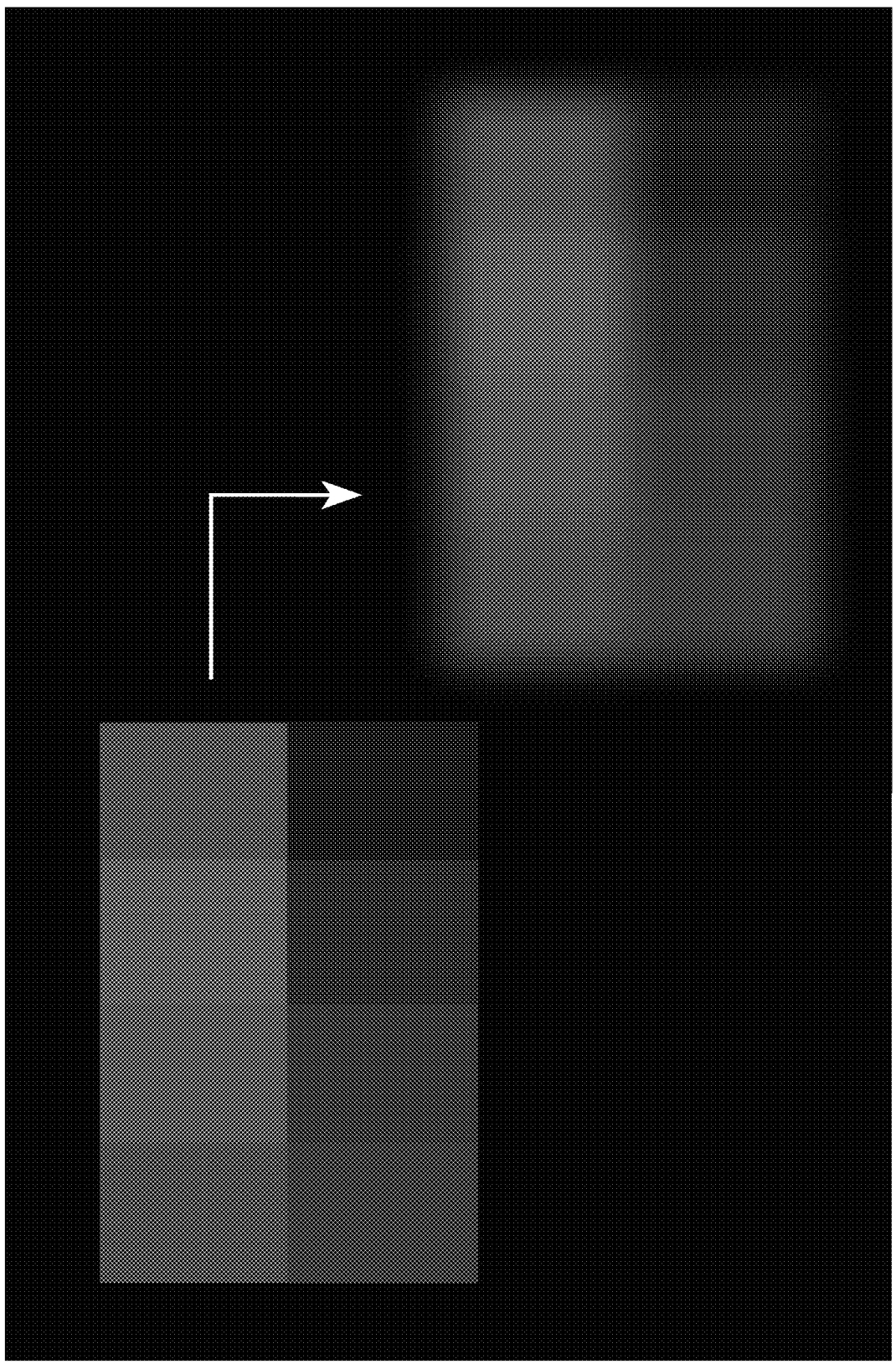
Figure 10F:

FIG. 10D shows the partitioning of the FIG. 10C capture into different sections (without the HUD elements). FIG. 10E then shows the generation of color contributions or color hotspots, and the blurring of the edges of the different sections. In this example, HUD elements are not taken into account when forming the color contributions (e.g., as implied from their absence in FIG. 10D). FIG. 10F shows the composited image. As will be appreciated from FIG. 10F, for example, blue from the police car's lights is reflected on the left A-pillar, red from the stoplight is reflected on the right A-pillar, some reflections are shown at the top of the windshield, etc.

Although this example is shown with a particular vehicle in a city scene, different types of vehicles may be used in this or other environments. For example, this approach is also applicable to vehicles such as, for example, motorcycles, trucks, boats, aircraft, spaceships, tractors, farm equipment, etc. Variations on the number and/or types of external lighting elements are also possible, e.g., depending on the environment.

Example 3: Binoculars for Nature Environment

FIGS. 11A-11F provide an example where lighting effects are applied to a third example object in a third three-dimensional scene in accordance with certain example embodiments. In this example, the third object is binoculars and the third three-dimensional scene is a natural landscape.

Figure 11A:
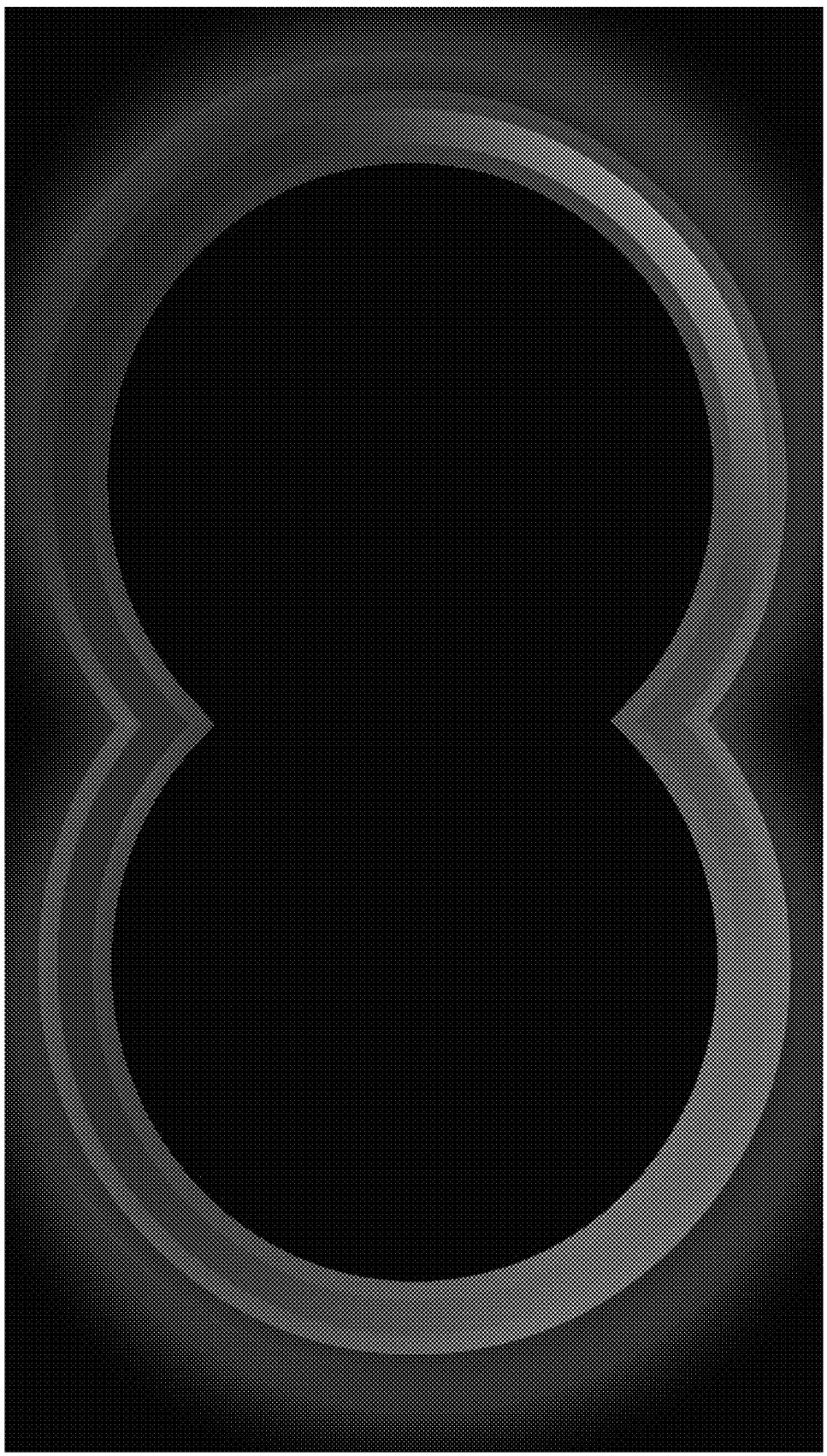
FIGS. 11A-11F provide an example where lighting effects are applied to a third example object in a third three-dimensional scene in accordance with certain example embodiments.
Figure 11B:
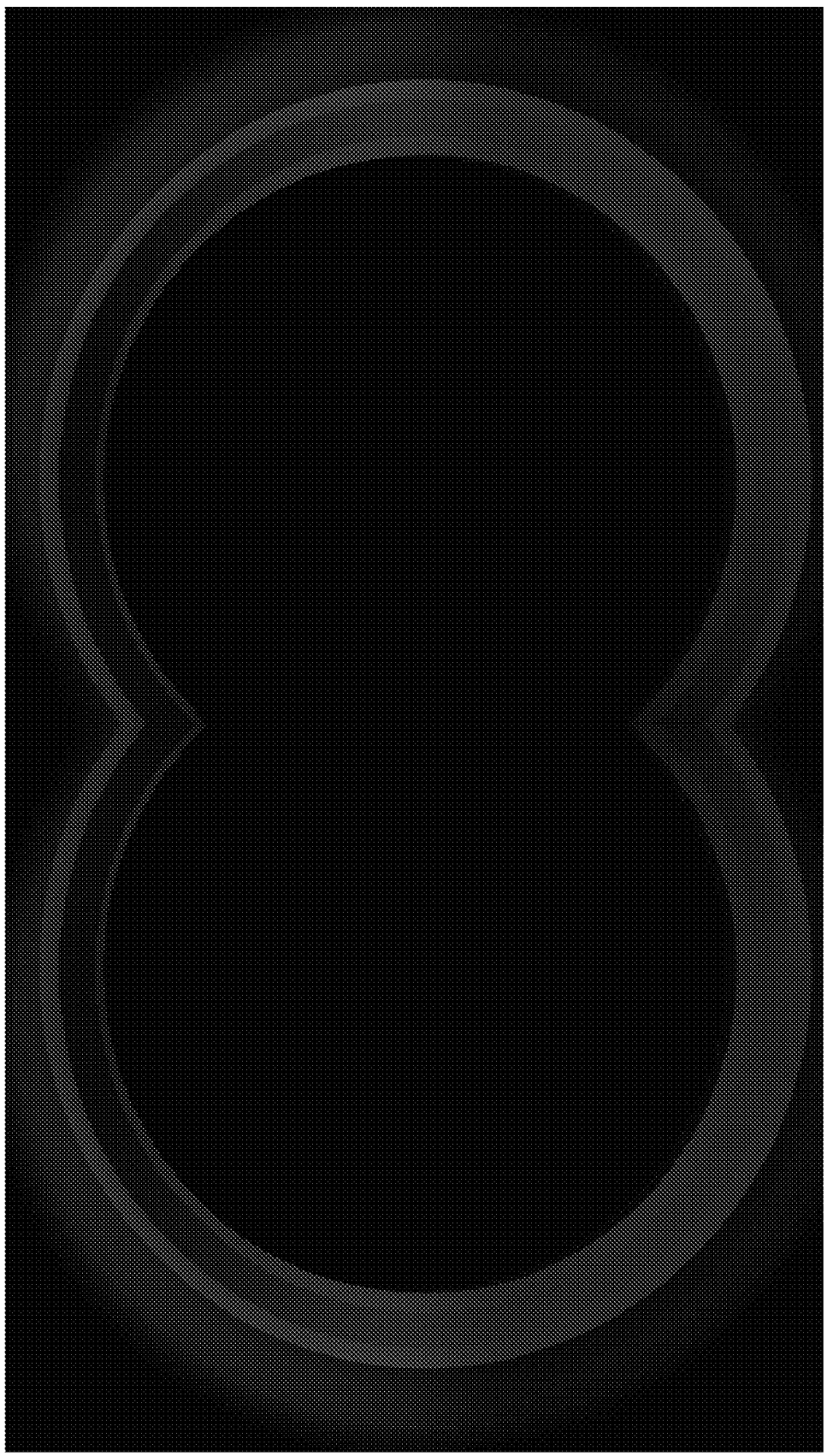

FIG. 11A is a 3D model of the binoculars. There are no lighting elements in the binoculars, so only the exterior is shown. FIG. 11B is a mask applicable to the FIG. 11A model. Again, the crimson-reddish color shows reflective areas, with the relative reflective intensities being demonstrated by differences in the coloration.

Figure 11C:
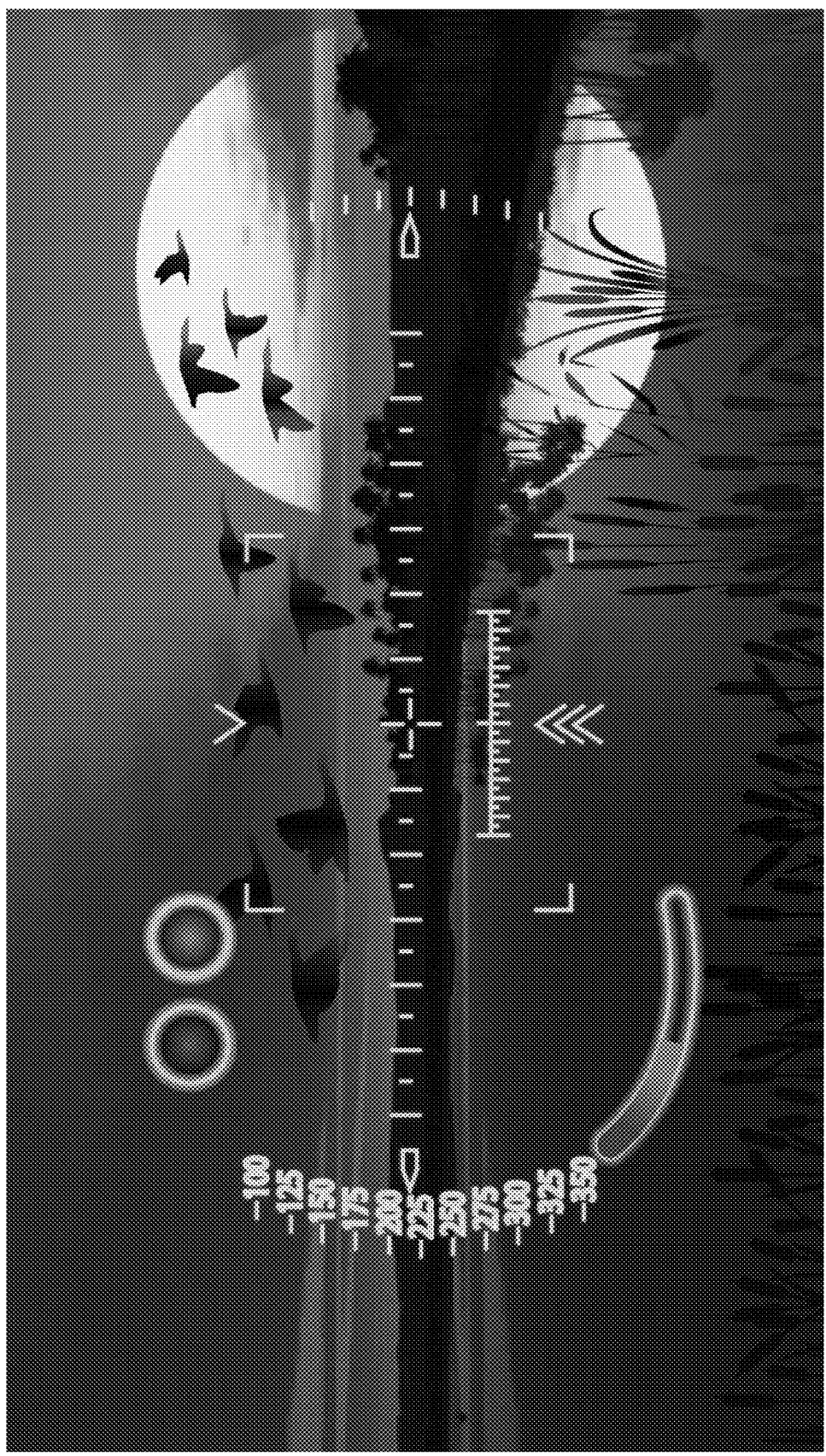

FIG. 11C is a capture of the natural environment, without the binoculars object being present. The sun is a relatively static light source, but it is obscured in this particular still image of the scene by the dynamic bird objects. The image is complicated because the water and sky themselves reflect the sun and become light sources as well. In the FIG. 11C example, HUD elements are shown.

Figure 11D:
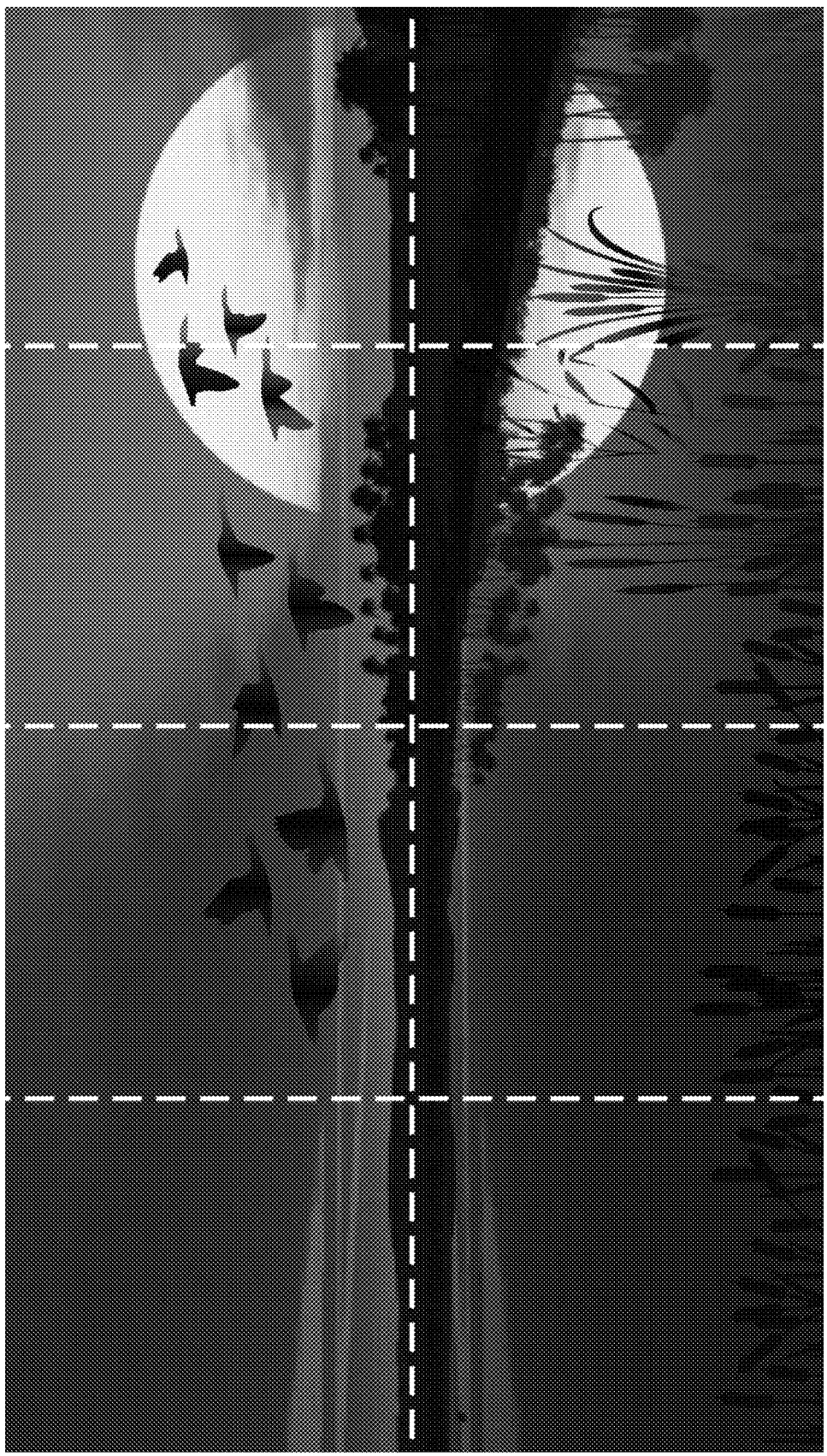
Figure 11E:
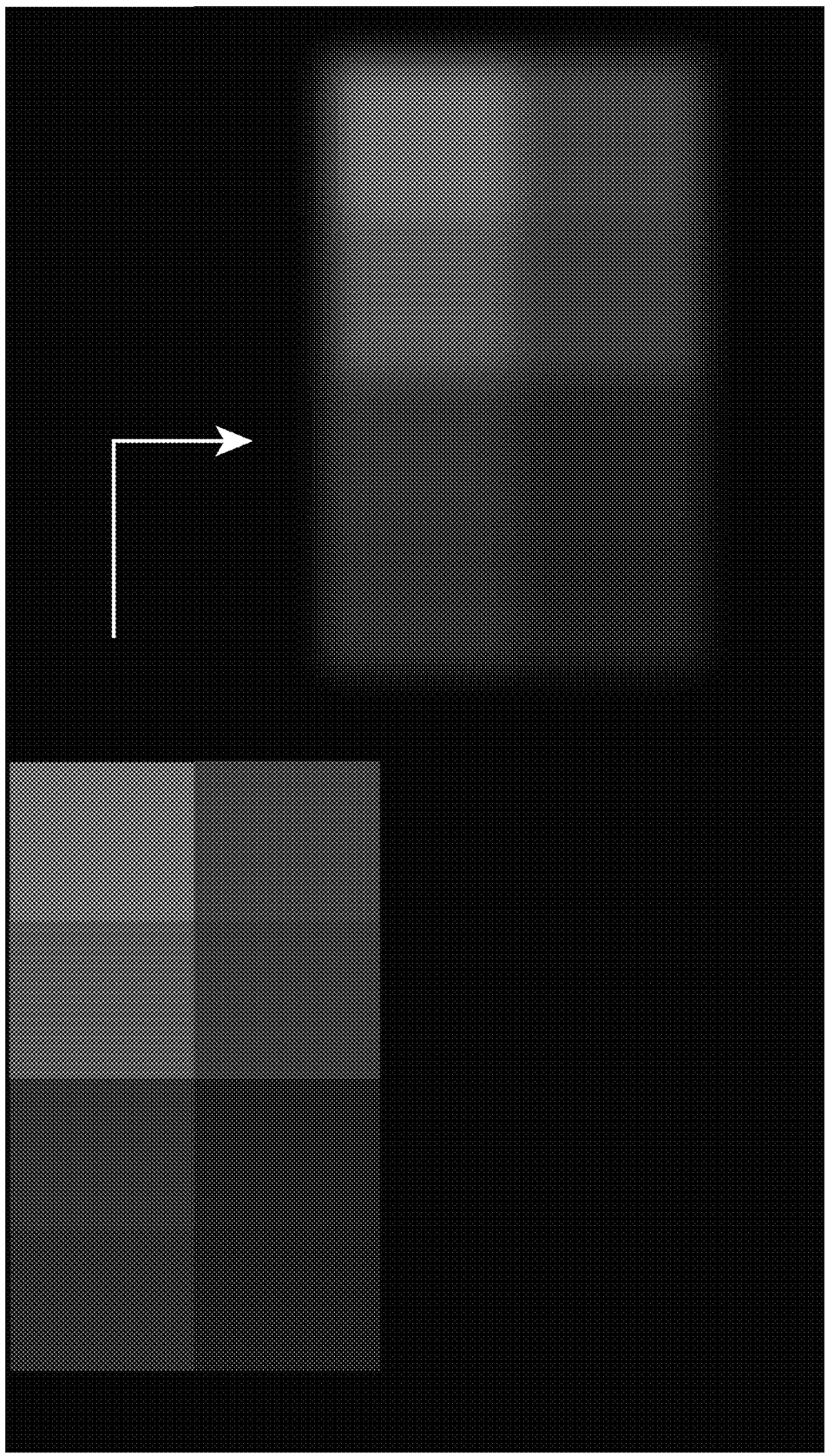
Figure 11F:
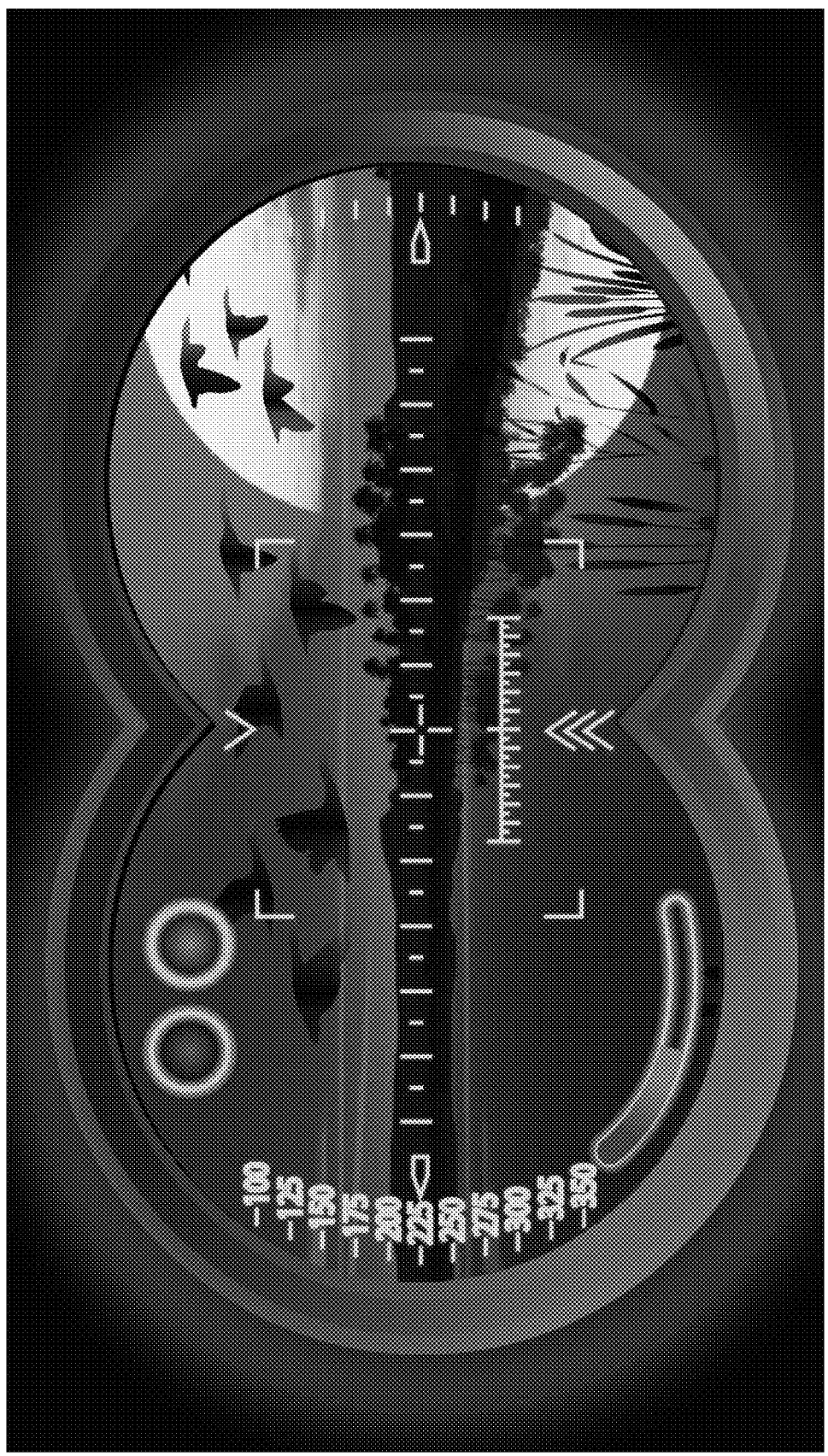

FIG. 11D shows the partitioning of the FIG. 11C capture into different sections (without the HUD elements). FIG. 11E then shows the generation of color contributions or color hotspots, and the blurring of the edges of the different sections. FIG. 11F shows the composited image.

Although this example is shown with a particular set of binoculars in a particular nature scene, different types of binoculars, scopes, and/or the like may be used in this or other environments. Other objects may obscure the main light source, and/or other objects may reflect the light source. This complexity may be present in other environments, as well.

Example 4: Application to Two-Dimensional Environments

The techniques described above focus on three-dimensional environments, e.g., where a virtual camera is provided to image an environment defined in three-dimensional space (along x, y, and z axes) in connection with three-dimensional objects. This approach is advantageous for modern gaming environments and other immersive experiences. However, the techniques disclosed herein also can be used in connection with two-dimensional environments, e.g., where a scene is provided in a two-coordinate system defined environment (which might still have some depth sense conveyed by virtue of the imagery used). This may be particularly advantageous in side-scrolling games and the like that may or may not incorporate a virtual camera. In this regard, FIGS. 12A-12F provide an example where lighting effects are applied to objects in an illustrative two-dimensional scene in accordance with certain example embodiments. In so doing, it becomes possible to link objects to the environment or otherwise make those objects feel more connected and/or responsive to changes in the environment related to lighting effects.

Figure 12A:
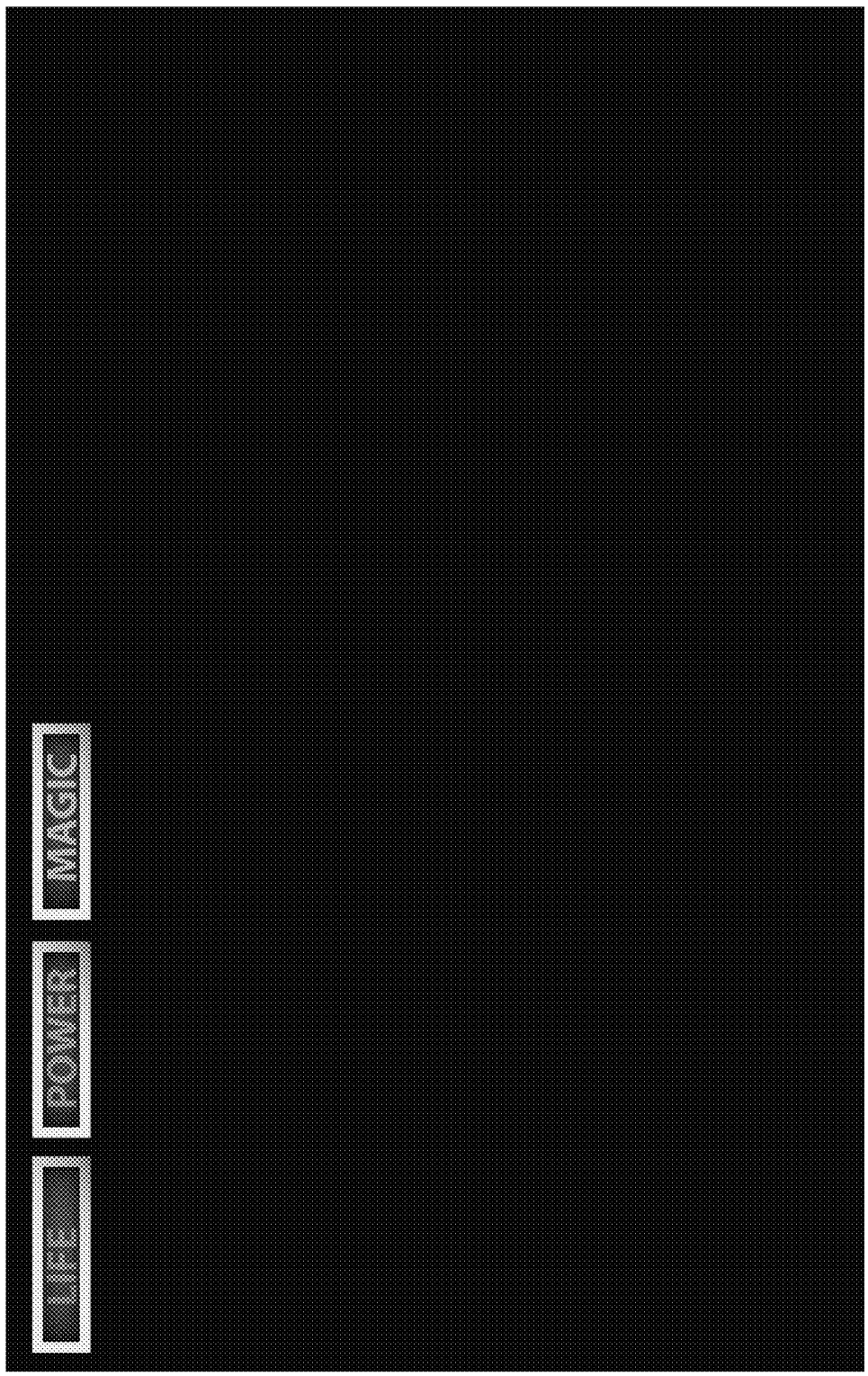
FIGS. 12A-12F provide an example where lighting effects are applied to objects in an illustrative two-dimensional scene in accordance with certain example embodiments.

In FIG. 12A, three elements are provided as a part of a virtual object that is linked to the environment in this way. Those three elements include life, power, and magic meters. The three elements may be thought of as comprising a single object. In certain example embodiments, the object may be provided in an area outside of the "action" associated with the environment (e.g., as a part of an upper or lower ribbon or banner, a left or right side area, etc.). In certain example embodiments, the object may be provided in an area that is part of the environment, e.g., so that the individual elements are able to float or otherwise appear "over" or "in front of" in-environment elements. In other words, in certain example embodiments, the virtual object may or may not be provided in a portion of the view that can overlap with in-environment objects.

Figure 12B:
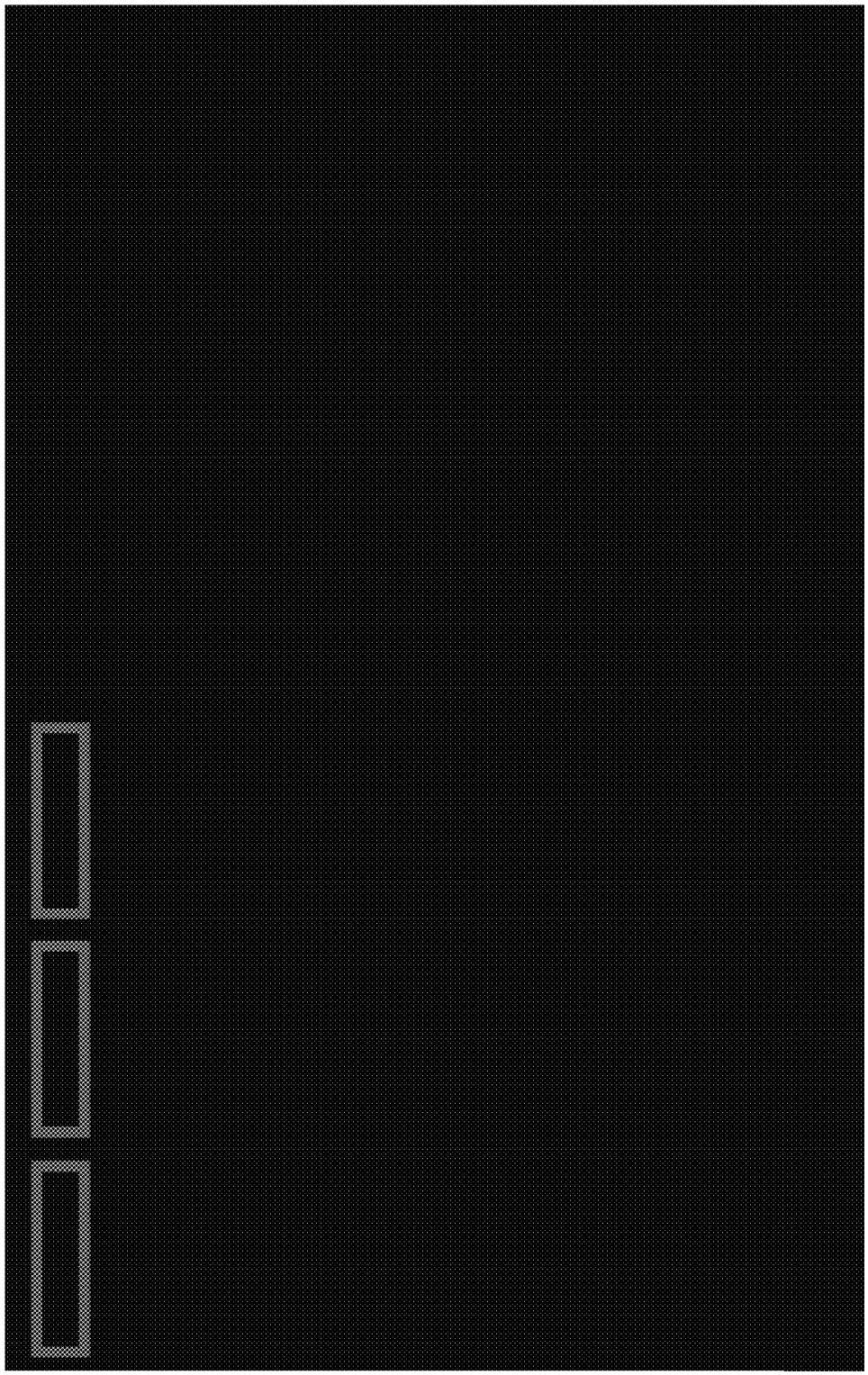

FIG. 12B is a mask applicable to the FIG. 12A model. In this example, the mask applies uniform coloration around the elements' areas. In different example embodiments, the masks may vary within and/or across one or more elements.

Figure 12C:
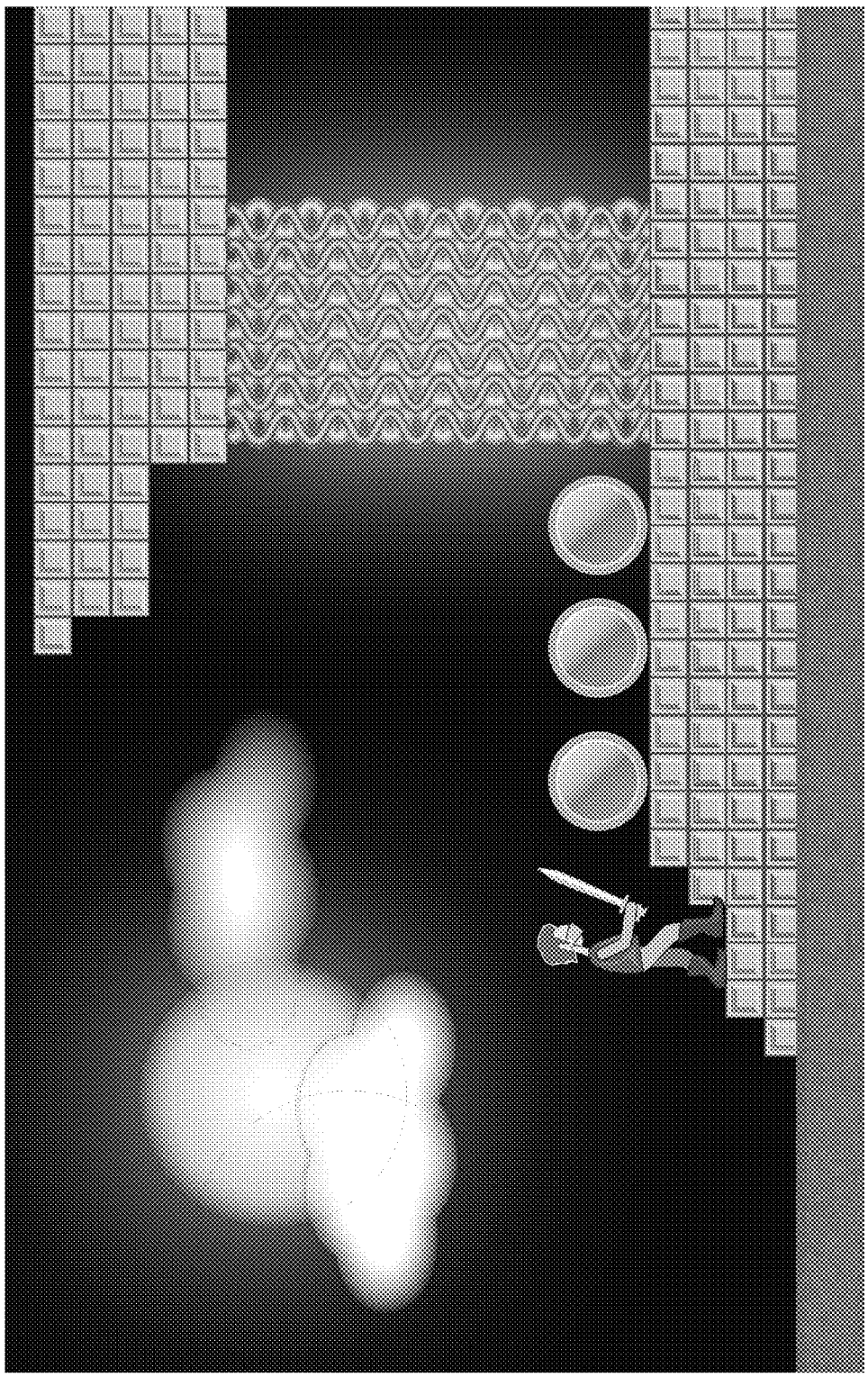
Figure 12D:
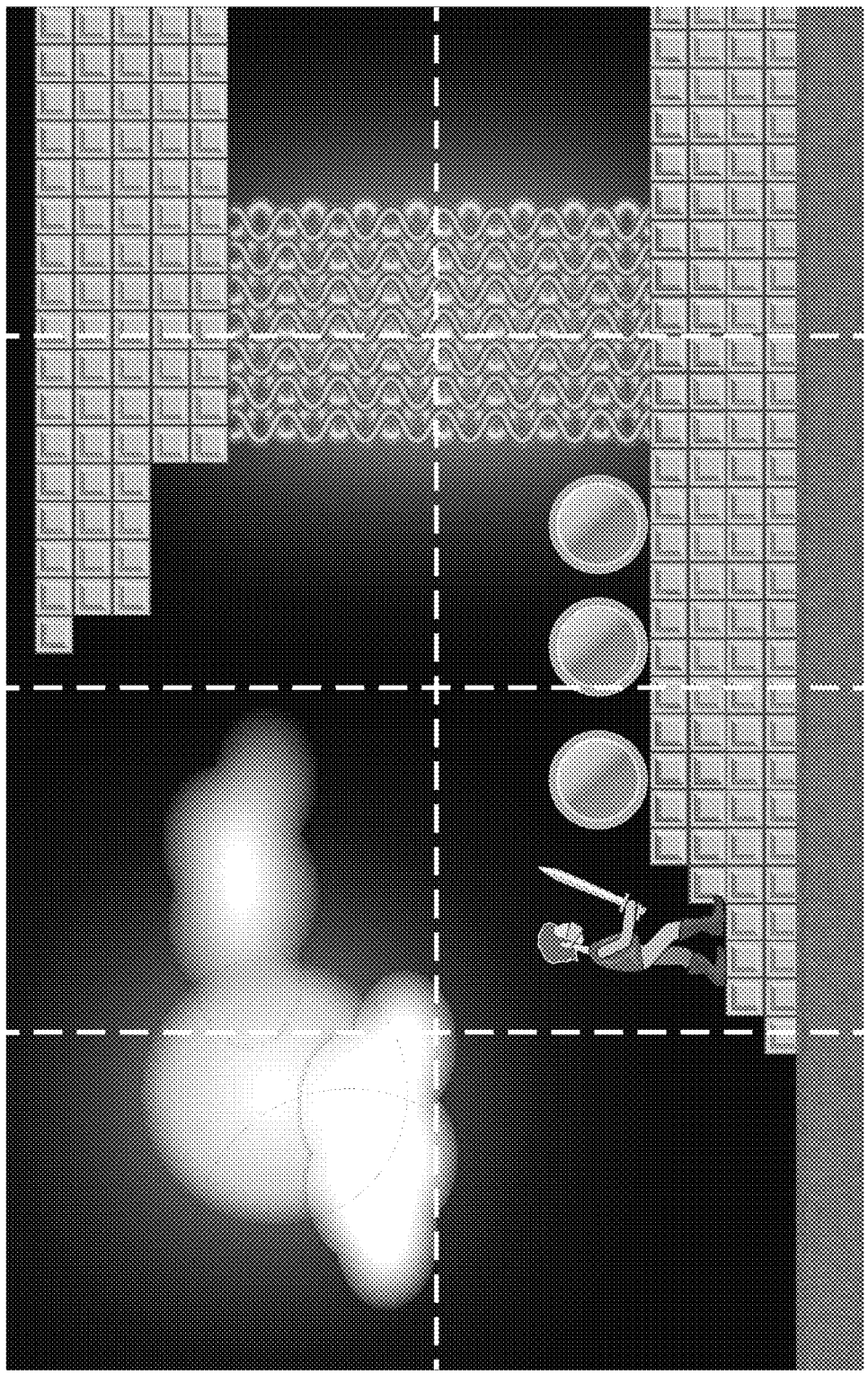
Figure 12E:
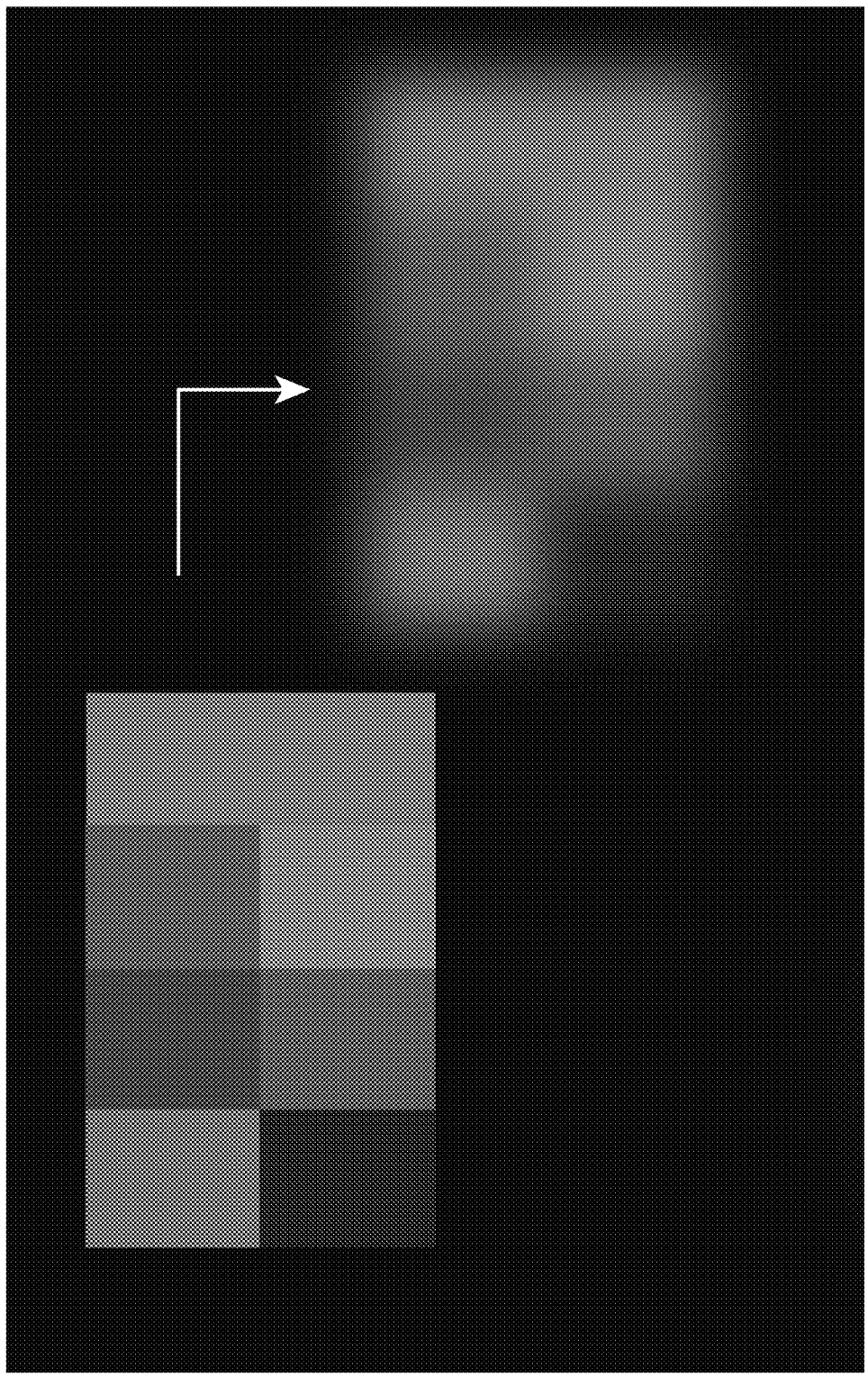

FIG. 12C is a capture showing a 2D side-scrolling adventure-type game. The FIG. 12C example includes the sun and an energy field as lighting elements. FIG. 12D shows the partitioning of the FIG. 12C capture into a plurality of sections, and FIG. 12E shows the generation of color contributions or color hotspots for the different sections and edge blurring.

Figure 12F:
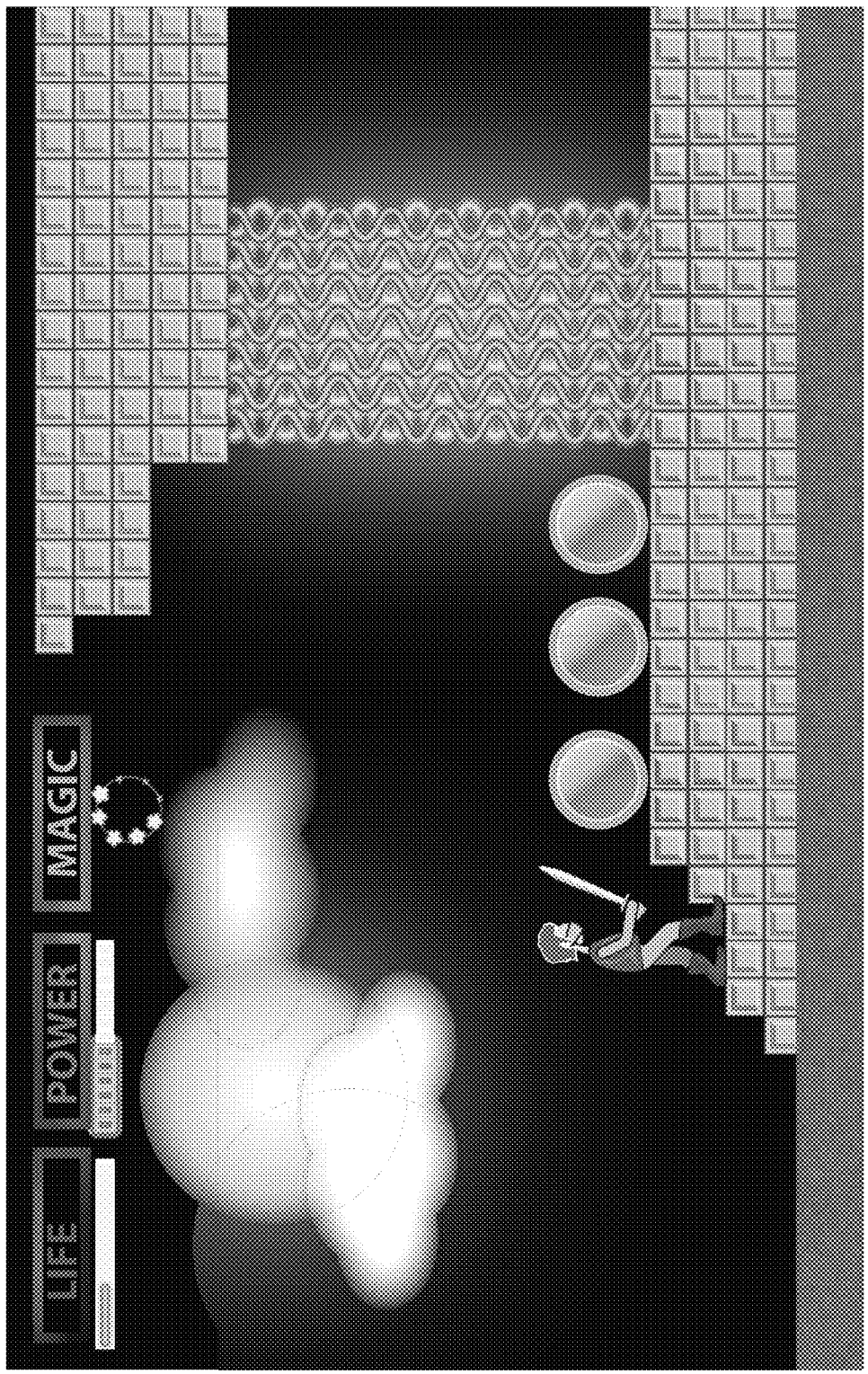

FIG. 12F shows the composited image, along with additional virtual elements including life, power, and magic level "meters" or indicators.

In the FIG. 12F example, the elements are located at an upper part of the screen. In order to speed processing, the sections in the lower row may be ignored. In other cases, to capture at least some of the feel from the lower part of the screen, a single row may be used.

In certain example embodiments, including (for example) for some side-scrollers, a HUD system may feel less digital and more physical and tactile. For example, HUD or HUD-like elements may appear to be made of metal, stone, glass, or the like. The techniques disclosed herein may be used in those scenarios as well, as they may allow the HUD or HUD-like elements to reflect things like explosions, magic spells, or the like.

Example Processing Techniques

Figure 13:
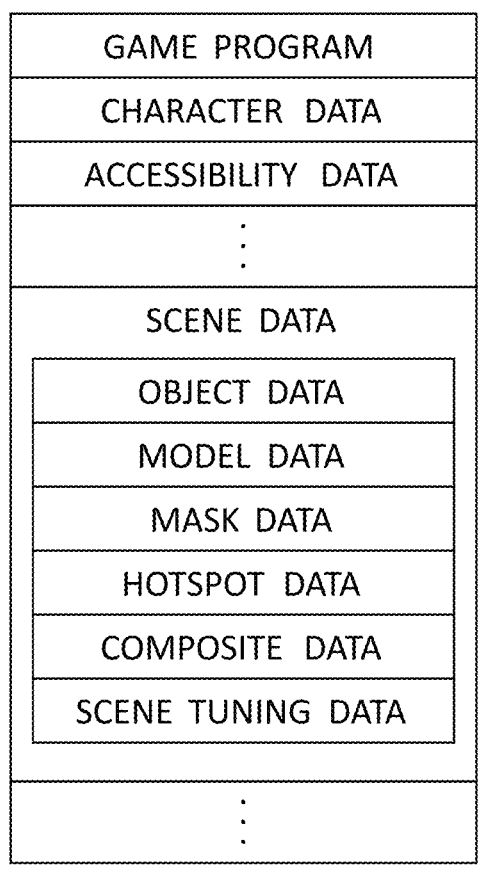
FIG. 13 is an example memory map that may be used in connection with certain example embodiments.

FIG. 13 is an example memory map that may be used in connection with certain example embodiments. The FIG. 13 memory map is for a game program. The game program includes information about the game being played such as, for example, information about different game stages, in-world physics information, rules for gameplay, etc. Character data includes data for one or more player characters controllable by a user using an I/O device and one or more non-player characters (who may be enemies, allies, bystanders, etc.). Accessibility data may be provided, e.g., to make the game more playable for different players with different skills or limitations. For example, accessibility data may include settings making the game program more accessible to people with photosensitivity, etc.

Scene data includes data for a plurality of different scenes playable in the game. Object data includes information about what objects are provided in the scene, how they behave, whether they are manipulable, etc. Model data includes 3D or other model data for those objects. For objects that are susceptible to lighting effects, data is provided for models such as those described above in connection with FIGS. 9A, 10A, 11A, and 12A. Similarly, mask data includes data corresponding to that described above in connection with FIGS. 9B, 10B, 11B, and 12B. Color contribution data/color hotspot data includes calculated or otherwise obtained data pertaining to the color contributions/color hotspots. Composite data includes the generated image applicable to the virtual environment.

Scene tuning data may be provided for individual scenes. This scene tuning data may specify parameters such as, for example, an indication that the contrast should be increased on a capture before or after hotspot data is generated, an amount or type of blur to provide, a downsampling mode to be used (e.g., averaging, median color usage, second-order interpolation, etc.), information about the number of sections to be generated, information about the shape of sections to be generated (e.g., rectangular sections, wedge-shaped sections, etc.), a rate at which captures should be taken, a mode in which a capture should be taken (e.g., LDR vs. HDR), a mode in which the composite image should be generated (e.g., LDR vs. HDR), what type of blur should be used, whether the blur will be handled by hardware or software, a flag indicating whether all sections should be processed for each frame, an order in which sections are to be processed across multiple frames, etc. It will be appreciated that some and/or all of these and/or other parameters may be specified on a scene-by-scene basis in certain example embodiments.

Figure 14:
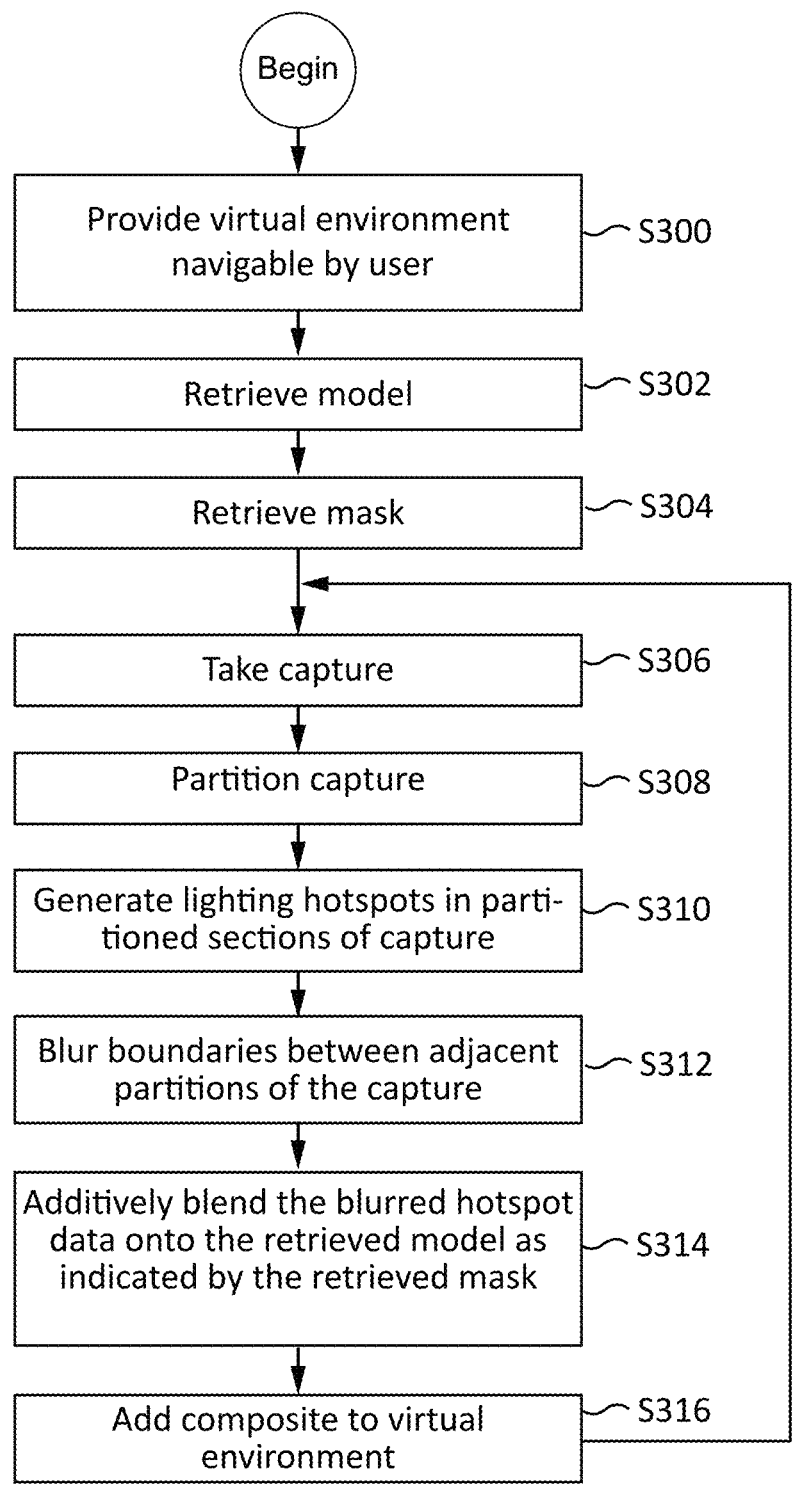
FIG. 14 is a flowchart showing a process for showing lighting effects in connection with certain example embodiments.

FIG. 14 is a flowchart showing a process for showing lighting effects in connection with certain example embodiments. A virtual environment in which the user can navigate is provided in step S300. This includes setting up the 3D virtual environment in certain example embodiments, disposing virtual objects therein including static and/or dynamic light sources, configuring program logic that causes changes in the virtual environment (e.g., in response to in-application events such as the user navigating a player character, a player character fighting a non-player character, etc.), and so on.

The model for the virtual object to which external lighting effects are to be applied is retrieved in step S302, and the mask for that virtual object is retrieved in step S304. A capture of the virtual environment is taken in step S306. The capture is partitioned into a plurality of partitions or sections in step S308.

In step S310, lighting hotspot data is generated for the partitioned sections of the capture. Boundaries between adjacent partitions (e.g., edges) are blurred in step S312. This may be performed by the GPU in certain example embodiments.

The blurred hotspot data is additively blended onto the retrieved object model as indicated by the retrieved mask in step S314. Doing so generates a composite image, and the composite image is effectively integrated into the virtual environment in step S316, e.g., by being layered onto the capture or a view of the virtual environment. The process then returns to step S306 so that additional frames can be processed.

One or more "polish" operations may be applied before, during, or after the additive blending. These polish operations may include application-wide or environment-by-environment factors. The polish operations may include, for example, increasing contrast on the capture, tuning the effects to make them appear stronger (e.g., to indicate an overwhelm of energy in a game), etc. In other cases, accessibility may be improved by decreasing overwhelming brightness, reducing the severity of or even completely eliminating strobing, and/or the like.

The "action" in the virtual environment is performed at a frame rate (e.g., 30 frames per second, 40 frames per second, 60 frames per second, etc.). Performing these operations for an entire frame at a time may be desirable for some applications and undesirable for others. That is, in some instances, it may be desirable to calculate hotspot data, additively blend the hotspot data to create the composite, and dispose the composite in the environment, for an entire frame and for each frame. In other words, although certain example embodiments have been described as involving two or more partitions, the techniques disclosed herein may be used in connection without any partitions and thus may operate on an entire capture or an entire frame at one time. But in other cases, this may be disadvantageous. Consider, for example, that small pixel effects may be generated when these operations are performed for an entire frame at a time. These small pixel effects may be advantageous in some instances, e.g., when there is a lot of metal and such small effects are likely to create realistic metal effects. However, in other instances, this may be undesirable. In certain example embodiments, it may be desirable to perform two compositing operations, one that works on an entire capture and one that works with different portions of the capture, and that together help form a single image that can be integrated into a view of the scene.

Figure 15:
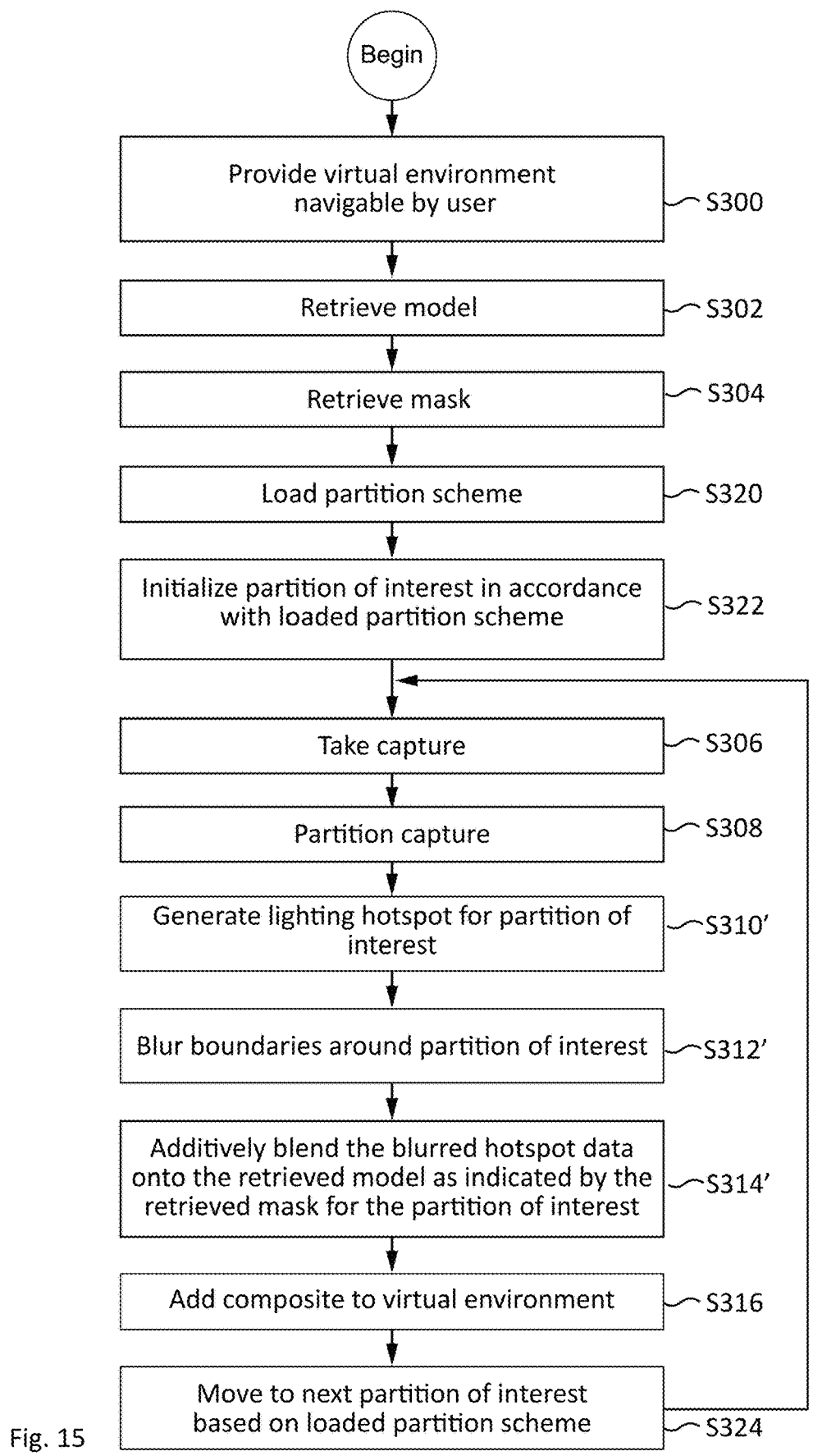
FIG. 15 is another flowchart showing a process for showing lighting effects in connection with certain example embodiments.

FIG. 15 is another flowchart showing a process for showing lighting effects in connection with certain example embodiments. FIG. 15 is similar to FIG. 14; however, only one section is processed with each frame. In other words, the hotspot data calculation, additive blending, and integration of the composite may be performed on a frame-by-frame basis, e.g., such that different sections are processed with different frames (potentially with adjacent sections being processed with successive frames and potentially with non-adjacent sections being processed with successive frames in different example embodiments). The section that is processed with each frame is defined in connection with a partition scheme. FIG. 15 thus includes the loading of a partition scheme in step S320. The partition scheme may state that the sections are to be processed in a sequential manner, moving left to right, right to left, top to bottom, bottom to top, row by row, column by column, and/or the like. Alternatively, the partition scheme may state that the sections are to be processed in a different order. In certain example embodiments, the order may be completely random or pseudo-random (e.g., such that each section is processed at a certain rate). In certain example embodiments, the order may be interleaved, e.g., 1-3-2-4, etc.

In step S322, the system is initialized and the initial partition of interest is set in accordance with the loaded partition scheme. The capture is still taken in step S306, and the capture is still partitioned in step S308. However, in step S310', lighting hotspot data is generated only for the partition of interest. Then, boundaries around the partition of interest are blurred in step S312'. Additive blending is performed for the partition of interest in step S314', and the composite image is layered onto the capture or in the virtual environment. The system moves to the next partition of interest based on the loaded partition scheme in step S324, and the process returns to step S306.

In certain example embodiments, if the hotspot data is not within a predetermined range, it may be discarded. Alternatively, if the hotspot data is within a predetermined range, it may be assumed that there is a lighting effect to be applied. By selectively discarding sections unlikely to convey a lighting effect, it may be possible to further increase the speed of the system.

Figure 16A:
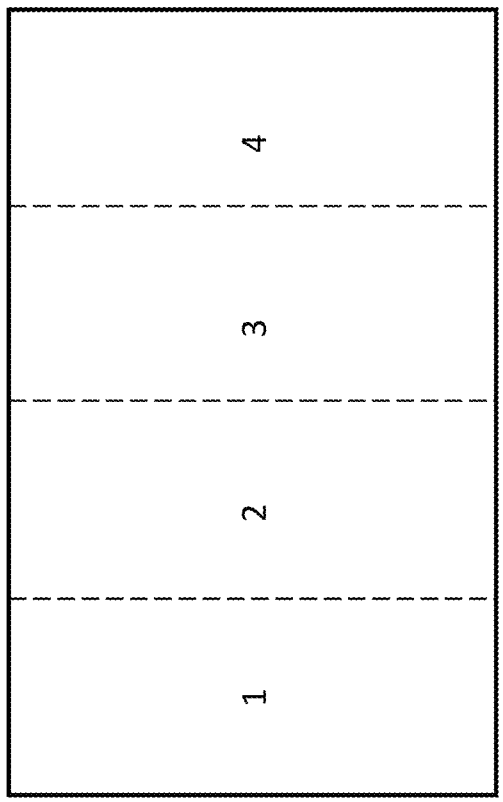
FIGS. 16A-16B are examples of how a rectangular display area can be partitioned in accordance with certain example embodiments.
Figure 16B:
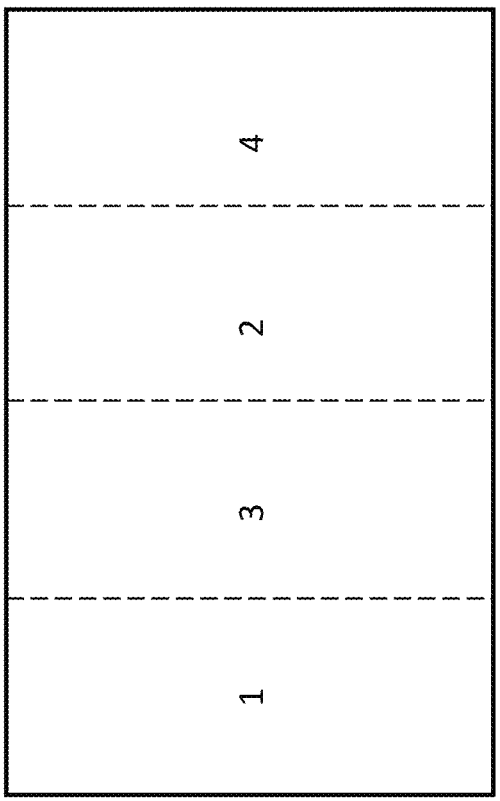

FIGS. 16A-16B are examples of how a rectangular display area can be partitioned in accordance with certain example embodiments. In FIGS. 16A-16B, the capture is partitioned into one row and four columns. As noted above, any number of partitions may be used in different example embodiments. However, for ease of processing, a number of partitions equaling a power of two may be desirable. FIG. 16A shows a sequential partition scheme, where the hotspots are processed for the partitions moving left to right, in order, with each frame. FIG. 16B, however, shows an interleaved partition scheme, where the hotspots are processed in a non-sequential order. Instead, a different partition is processed with each frame, but at least one partition is left between those partitions that are processed in back-to-back frames. That is, hotspot data is generated for the leftmost partition first, the third partition from the left second, the second partition from the left third, and the rightmost partition last.

In FIGS. 16A-16B, samples are taken with every frame, but only one-quarter of the display is sampled at a time. The samples are taken in vertical stripes. Using a non-sequential pattern may provide effects that are more difficult to detect compared to simply "scanning across" the screen. Other patterns may be usable too, e.g., to obtain other effects or deal with particularities of the virtual environment.

Figure 17A:
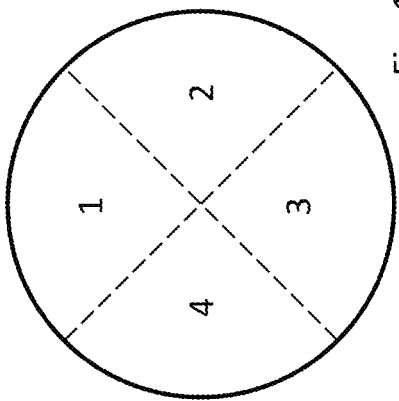
FIGS. 17A-17B are examples of how a circular display area can be partitioned in accordance with certain example embodiments.
Figure 17B:
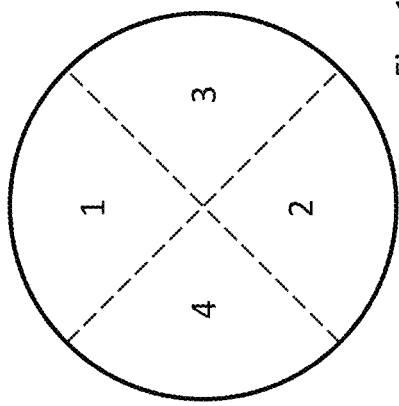

As indicated above, the shape of the partitions need not be rectangular. A circular, ovular, or other arrangement involving wedge-shaped partitions may be desirable, for example, where virtual objections are scopes, binoculars, etc. Even in cases where helmets or windows or round, wedge-shaped partitions might be used. FIGS. 17A-17B show circular objects with wedge-shaped partitions, and they are examples of how a circular display area can be partitioned in accordance with certain example embodiments. The partitions may be processed in order (e.g., clockwise as shown in FIG. 17A or counterclockwise), or in a more interleaved manner (e.g., as shown in FIG. 17B).

It will be appreciated that the partition scheme may specify that hotspot data should be generated for a number of frames before moving to the next partition.

Example Advantages of Certain Example Embodiments

The techniques disclosed herein provide a number of technical advantages. One technical advantage of certain example embodiments relates to the reduced computational complexity and lower bandwidth requirements for calculating lighting effects associated with such objects. The approach disclosed herein also helps avoid complications that tended to arise when attempting to move the object into the virtual environment as if it were a separate object therein (e.g., related to "unrealistic" behaviors such as, for example, the object receiving light from behind or above the user, non-lighting related effects like smoke appearing inside an object that otherwise should seem sealed, etc.).

Another set of advantages relates to certain example embodiments involving an approach where a virtual object that is subjected to the lighting effects does not need to actually inhabit the virtual environment (e.g., game world). Rather, it is composited on top of the virtual environment as if it were a part of a HUD-like system itself. The lighting effects thus are already calculated when the object is rendered and there is no need for a separate set of lighting-related calculations for lighting effects taking place "within" the object.

With some games, for example, helmet interiors and other objects (such as sniper scopes and binoculars) appear as simple images that are drawn on top of the screen simply do not appear to react to lighting at all. Other games might include a 3D helmet or other object that inhabits the game world and receives actual lighting, but only within a very controlled scripted sequence before it fades from view (e.g., in connection with a cutscene or the like). The approach disclosed herein in a sense uses composite images drawn on top of the screen but nonetheless are made responsive to static and dynamic lighting elements, well beyond tightly-scripted cutscenes and the like.

Thus, the simulated lighting system of certain example embodiments allows for the creation of very immersive presentations with 3D-appearing objects that seem to truly inhabit and respond to the virtual world. Moreover, because certain example embodiments take all of the contents of the screen and apply it to the object, full screen effects, and HUD and UI elements, can light the object. With regard to the former, one example is a thermal visor, which can turn the screen purple and orange (for example), and these colors can be cast into the helmet object's lighting. With regard to the latter, a user may interact with a map, logbook, or the like. These may be implemented as full-screen menu systems that appear to be shown in the object's (e.g., helmet's) view. These UI or other elements also will reflect and contribute to the lighting of the object.

As will be appreciated, the simulated lighting approach of certain example embodiments results in what appears to be a very convincing, fully lit object, but it is generated at an extremely low computational cost, allowing for the delivery of visuals that appear to exceed the capabilities of some current hardware configurations. Indeed, the techniques disclosed herein may be particularly advantageous for use with mobile games run via an app on a smart phone or the like.

The approach of certain example embodiments advantageously is compatible with changes to lighting technologies as it uses captures and compositing approaches.

Although certain example embodiments have been described in relation to simulating lighting data, the techniques disclosed herein may be used in connection with other or additional objects that appear to emit light in the virtual environment but do not necessarily contain in-environment (e.g., in-game) lighting data. For example, explosions, laser blasts, fire, etc., are often created using 2D particle systems. These effects can be accomplished using virtual lights, but most of them are not (especially for mobile games), as this approach is very resource intensive. Certain example embodiments are able to reflect particle elements, regardless of whether they include lighting data. Thus, it is possible to show a number of different lighting-related effects even if the objects causing those effects are not in themselves lights per se. Similarly, filters as may be used in providing thermal, x-ray, or other visioning may not necessarily contain lighting data, but they may be treated as lighting-related elements in certain example embodiments. In-application menus, HUD systems, flashing alerts, and the like also may be taken into account as lighting-related effects in certain example embodiments.

Although certain example embodiments partition the capture into a grid with two or more cells, in certain example embodiments, the capture could be left unaltered other than having a blur applied thereto. Doing so would allow very small elements (e.g., a bright firefly or a lit match) to cast light on the object. This could be useful for a slow-paced game that is very dark and cloaked in shadows, where every bit of light counts, such as a survival horror game.

The approach described above has been found to work well with rough metal surfaces. The lighting texture is blurred, which helps the lighting feel realistic with respect to the object's material. For highly polished and shiny metal, an alternative approach may be used. In such cases, a capture with no grid or blur applied may be used. Additionally, the image may be blended twice: once "normally" and once more "additively" (e.g., to help make the underlying colors brighter). If this approach is carefully tuned, it would allow the object to both simulate lighting as well as appear to reflect the environment like a chrome material might.

Although certain example embodiments are described in connection with additive blending, it will be appreciated that other blending modes may be used in place of or in addition to additive blending. "Normal" blending, colorization-like, and/or other approaches may be used in certain example embodiments. For instance, if the virtual object (e.g., helmet) were bright white, for example, additive blending might not appear to do anything perceivable by the user. In this case and in other cases, another blending mode, colorization, or other approach may be used to create an effect perceivable by the user that also creates a desired visual impact (e.g., making the virtual object seem more responsive to the virtual environment). Thus, different blending, coloration, and/or other effects may be applied to create a desired effect, potentially in situations where an additive blending approach might not produce a desired (or any) visual effect for a user to perceive. "Colorization" thus may be considered a "blending" approach (or at least an equivalent thereto) for the purposes of certain example embodiments.

Although certain example embodiments use a downsampling approach, different techniques can be used in different example embodiments. For instance, a simple color selection can be used in some instances, a particular filter or tone can be used, noise or other distortion can be introduced, etc. These approaches can be applied to all or a portion of a screen in certain example embodiments to provide desired effects. Thus, it will be appreciated that the approach for determining a color contribution (or color hotspot) for a capture or portion thereof is not limited to a downsampling.

Although certain example embodiments have been described in connection with a mask, it will be appreciated that other techniques can be used to imply a texture that should be used for a virtual object. For instance, vertex coloring may be used in place of a pixel-based mask approach in certain example embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A non-transitory computer readable storage medium comprising instructions that, when executed by at least one processor of an information processing system, are configured to perform operations comprising:
providing a virtual environment navigable by a user providing user input, the virtual environment being subject to one or more lighting effects from one or more virtual environment light sources therein; and
generating, for the user, a view of the virtual environment in connection with a virtual camera, the view of the virtual environment including at least a portion of a virtual object influenced by the virtual environment, the virtual object being defined in connection with an object model, wherein the generating of the view comprises:
calculating color contributions for a plurality of sections into which an image obtained from the virtual camera is partitioned;
creating a composite image by blending the calculated color contributions onto the object model in accordance with an object mask, the object mask defining different effects to be applied to different parts of the virtual object; and
integrating the created composite image in the view of the virtual environment.

2. The non-transitory computer readable storage medium according to claim 1, wherein edges of the calculated color contributions are blurred.

3. The non-transitory computer readable storage medium according to claim 2, wherein the edges are blurred where there are adjacent sections.

4. The non-transitory computer readable storage medium according to claim 1, wherein the created composite image is a two-dimensional image, and the virtual object is represented as a partial three-dimensional model.

5. The non-transitory computer readable storage medium according to claim 1, wherein the object model includes one or more object light sources different from the one or more virtual environment light sources.

6. The non-transitory computer readable storage medium according to claim 5, wherein lighting effects from the one or more object light sources are not taken into account when calculating the color contributions.

7. The non-transitory computer readable storage medium according to claim 1, wherein the view includes one or more head-up display (HUD) elements that appear to the user as being provided by the virtual object.

8. The non-transitory computer readable storage medium according to claim 7, wherein lighting effects from the one or more HUD elements are taken into account when calculating the color contributions.

9. The non-transitory computer readable storage medium according to claim 1, wherein the color contributions are calculated by downsampling colors in the respective sections.

10. The non-transitory computer readable storage medium according to claim 9, wherein the downsampling includes calculating average colors for the respective sections.

11. The non-transitory computer readable storage medium according to claim 1, wherein a plurality of virtual environment light sources create a plurality of different lighting effects in the virtual environment, at least some of the virtual environment light sources being dynamic light sources creating dynamic lighting effects responsive to events transpiring in the virtual environment.

12. The non-transitory computer readable storage medium according to claim 1, wherein the view of the virtual environment is generated at a frame rate, and wherein the image obtained from the virtual camera corresponds to a frame.

13. The non-transitory computer readable storage medium according to claim 12, wherein the calculating, creating, and integrating are performed on a frame-by-frame basis such that different sections are processed with different frames.

14. The non-transitory computer readable storage medium according to claim 13, wherein non-adjacent sections are processed for successive frames.

15. An information processing system comprising:
at least one processor and a memory, the at least one processor being configured to perform operations comprising:
providing a virtual environment navigable by a user providing user input, the virtual environment being subject to one or more lighting effects from one or more virtual environment light sources therein; and
generating, for the user, a view including the virtual environment and at least a portion of a virtual object, wherein the generating of the view comprises:
obtaining hotspot data for a capture of the virtual environment; and
blending the obtained hotspot data onto the virtual object, in generating the view to incorporate the one or more lighting effects while the virtual environment is being navigated by the user.

16. The information processing system according to claim 15, wherein the virtual environment is a part of a side-scrolling video game.

17. The information processing system according to claim 15, wherein the virtual object is provided in a portion of the view that can overlap with in-environment objects.

18. The information processing system according to claim 15, wherein the hotspot data is obtained by downsampling.

19. The information processing system according to claim 15, wherein:
a plurality of virtual environment light sources create a plurality of different lighting effects in the virtual environment, at least some of the virtual environment light sources being dynamic light sources creating dynamic lighting effects responsive to events transpiring in the virtual environment;
the view is generated at a frame rate; and
the obtaining and blending are performed on a frame-by-frame basis such that different sections of the capture are processed with different frames.

20. The information processing system according to claim 15, wherein hotspot data is obtained for a plurality of sections into which the capture of the virtual environment is partitioned.

21. The information processing system according to claim 15, wherein the blending is additive and performed in accordance with an object mask that defines different effects to be applied to different parts of the virtual object.

22. The information processing system according to claim 15, wherein the capture includes one or more virtual environment light sources but lacks at least one element that ultimately is displayed to the user via the view including the virtual environment.

23. The information processing system according to claim 22, wherein the capture lacks the virtual object.

24. An information processing method for use with an information processing system, the method comprising:
providing a virtual environment navigable by a user providing user input, the virtual environment being subject to one or more lighting effects from one or more virtual environment light sources therein; and
generating, for the user, a view including the virtual environment and at least a portion of a virtual object, wherein the generating of the view comprises:
obtaining color hotspot data for a capture of the virtual environment; and
blending the obtained color hotspot data onto the virtual object, in generating the view to incorporate the one or more lighting effects while the virtual environment is being navigated by the user.

25. The information processing method according to claim 24, wherein the virtual environment is a three-dimensional virtual environment and the blending generates a two-dimensional composite image, the method further comprising integrating the two-dimensional composite image in the view including the three-dimensional virtual environment.

26. The information processing method according to claim 24, wherein the virtual object is defined in connection with a three-dimensional model modeling only a part of the virtual object.

27. The information processing method according to claim 24, wherein the virtual object comprises one or more object light sources different from the one or more virtual environment light sources, and wherein lighting effects from the one or more object light sources are not taken into account when obtaining the color hotspot data.

28. The information processing method according to claim 24, wherein the view includes one or more head-up display (HUD) elements that appear to the user being provided by the virtual object, and
wherein lighting effects from the one or more HUD elements are taken into account when obtaining the color hotspot data.

29. The information processing method according to claim 24, wherein:
a plurality of virtual environment light sources create a plurality of different lighting effects in the virtual environment, at least some of the virtual environment light sources being dynamic light sources creating dynamic lighting effects responsive to events transpiring in the virtual environment;
the view is generated at a frame rate; and
the obtaining and blending are performed on a frame-by-frame basis such that different sections are processed with different frames.

30. The information processing method according to claim 24, wherein hotspot data is obtained for a plurality of sections into which the capture of the virtual environment is partitioned.

31. The information processing method according to claim 24, wherein the blending is additive and performed in accordance with an object mask that defines different effects to be applied to different parts of the virtual object.

* * * * *